(12) United States Patent
Binks et al.

(10) Patent No.: US 9,551,298 B2
(45) Date of Patent: Jan. 24, 2017

(54) VARIABLE AREA FAN NOZZLE WITH ONE OR MORE INTEGRATED BLOCKER DOORS

(71) Applicant: Rohr, Inc., Chula Vista, CA (US)

(72) Inventors: Alan Binks, San Diego, CA (US); Michael J. Layland, Bonita, CA (US); Norman J. James, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 651 days.

(21) Appl. No.: 13/949,998

(22) Filed: Jul. 24, 2013

(65) Prior Publication Data

US 2014/0027537 A1 Jan. 30, 2014

Related U.S. Application Data

(60) Provisional application No. 61/675,274, filed on Jul. 24, 2012.

(51) Int. Cl.
*F02K 1/72* (2006.01)
*F02K 1/09* (2006.01)
*F02K 1/76* (2006.01)

(52) U.S. Cl.
CPC . *F02K 1/72* (2013.01); *F02K 1/09* (2013.01); *F02K 1/763* (2013.01); *F02K 1/766* (2013.01); *F05D 2260/57* (2013.01)

(58) Field of Classification Search
CPC ............... F02K 1/06; F02K 1/09; F02K 1/62; F02K 1/625; F02K 1/64; F02K 1/72; F02K 1/70; F02K 1/76–1/766; F05D 2260/57
USPC .................................... 60/226.2, 226.3, 771
See application file for complete search history.

(56) References Cited

U.S. PATENT DOCUMENTS

| 3,779,010 A * | 12/1973 | Chamay | F02K 1/09 239/265.31 |
| 3,829,020 A * | 8/1974 | Stearns | F02K 1/09 181/216 |
| 4,922,713 A * | 5/1990 | Barbarin | F02K 1/72 239/265.31 |
| 5,655,360 A * | 8/1997 | Butler | F02K 1/72 239/265.29 |
| 5,778,659 A * | 7/1998 | Duesler | F02K 1/09 239/265.27 |
| 2009/0288386 A1* | 11/2009 | Marshall | F02K 1/09 60/204 |
| 2011/0277448 A1* | 11/2011 | Roberts | B64D 29/06 60/226.2 |

* cited by examiner

*Primary Examiner* — Gerald L Sung
*Assistant Examiner* — Alain Chau
(74) *Attorney, Agent, or Firm* — O'Shea Getz P.C.

(57) ABSTRACT

A nacelle assembly for a turbofan engine includes a forward nacelle portion having an aft edge and defining a bypass duct that transports bypass airflow of the turbofan engine, a translatable sleeve that is translatable aft of the forward nacelle portion, and a variable area fan nozzle (VAFN) airfoil that is movable between a stowed position, a VAFN flow position, and a thrust reverse position. Blocker doors for the thrust position are integrated into the VAFN airfoil.

18 Claims, 20 Drawing Sheets

VARIABLE AREA FAN NOZZLE WITH ONE OR MORE INTEGRATED BLOCKER DOORS

This application claims priority to U.S. Patent Appln. No. 61/675,274 filed Jul. 24, 2012.

BACKGROUND

Typical aircraft turbofan jet engines include an engine core, a nacelle that surrounds the engine core, and a fan that draws in a flow of air that is split into bypass airflow and engine core airflow. The nacelle provides a bypass duct that surrounds the engine core. The bypass airflow is transported through the bypass duct. The nacelle is configured to promote laminar flow of air through the bypass duct. The engine core includes a multi-stage compressor to compress the engine core airflow, a combustor to add thermal energy to the compressed engine core airflow, and a turbine section downstream of the combustor to produce mechanical power from the engine core airflow. The typical turbine section has two and sometimes three turbine stages. The turbine stages are used to drive the compressor and the fan. After exiting from the turbine section; the engine core airflow exits through an exhaust nozzle at the aft end of the engine.

In a turbofan engine, the fan typically produces a majority of the thrust produced by the engine. The bypass airflow can be used to produce reverse thrust typically used during landing. Thrust reversers mounted in the nacelle selectively reverse the direction of the bypass airflow to generate reverse thrust. During normal engine operation, the bypass airflow may or may not be mixed with the exhausted engine core airflow prior to exiting the engine assembly.

Several turbofan engine parameters have a significant impact upon engine performance. Bypass ratio (BPR) is the ratio of the bypass airflow rate to the engine core airflow rate. A high BPR engine (e.g., BPR of 5 or more) typically has better specific fuel consumption (SFC) and is typically quieter than a low BPR engine of equal thrust. In general, a higher BPR results in lower average exhaust velocities and less jet noise at a specific thrust. A turbofan engine's performance is also affected by the engine's fan pressure ratio (FPR). FPR is the ratio of the air pressure at the engine's fan nozzle exit to the pressure of the air entering the fan. A lower FPR results in lower exhaust velocity and higher propulsive efficiency. Reducing an engine's FPR can reach a practical limit, however, as a low FPR may not generate sufficient thrust and may cause engine fan stall, blade flutter, and/or compressor surge under certain operating conditions.

One approach for optimizing the performance of an engine over various flight conditions involves varying the fan nozzle exit area. By selectively varying the fan nozzle's exit area, an engine's bypass flow characteristics can be adjusted to better match a particular flight condition, for example, by optimizing the FPR relative to the particular thrust level being employed. For example, a variable area fan nozzle (VAFN) assembly that forms a rear outer portion of the bypass duct can include an airfoil that is moved aft into a VAFN flow position so as to open an additional bypass flow that exits the nacelle forward of the VAFN assembly. That is, an opening is created between the translatable sleeve and the VAFN airfoil, such that an airflow in the bypass duct is split into a flow that remains in the bypass duct and moves past the airfoil, and a flow that exits the bypass duct through the VAFN opening and over an outer surface of the airfoil.

Turbofan engines typically include a thrust reverser operation, in which the translatable sleeve of the VAFN assembly is moved to expose a cascade array opening, and blocker doors are deployed from in front of the airfoil into the bypass duct. In this thrust reverse position, the blocker doors redirect the airflow in the bypass duct to exit out the cascade array. The VAFN airfoil is typically much too thin and fragile to sustain the airflow loads necessary to divert the bypass airflow to the cascade array. Therefore, the blocker doors are typically deployed from other structures so the blocker doors extend into the bypass duct flow. The VAFN assembly can be selectively positioned anywhere between a stowed position in which no additional bypass exit is formed, a VAFN flow position in which the additional bypass flow exits the bypass duct through the VAFN opening, and a fully deployed position in which the additional bypass exit is open to a maximum extent, such as for thrust reverse operation.

Improving the aerodynamic flow through the bypass duct and around the engine nacelle is a matter of continuous concern for aircraft design. Therefore, it is desirable to locate the VAFN assembly so as to improve aerodynamic flow Improved VAFN assemblies are desired.

SUMMARY

A nacelle assembly for a turbofan engine having an engine centerline is disclosed. The nacelle assembly includes (a) a forward nacelle portion having an aft edge and defining a bypass duct that extends at least partially around the engine centerline, the bypass duct being configured to transport bypass airflow of the turbofan engine, (b) a translatable sleeve having a forward edge that extends circumferentially at least partially around the bypass duct and that is translatable away from the aft edge of the forward nacelle portion, and (c) a variable area fan nozzle (VAFN) airfoil that includes a forward end and an aft end, each of which extends circumferentially at least partially around the bypass duct, and that is variably movable between a stowed position, a VAFN flow position, and a thrust reverse position, and points in between. When the VAFN airfoil is in the stowed position, the VAFN airfoil is positioned substantially adjacent the aft edge of the translatable sleeve and forms a substantially continuous outer surface extending from an outer surface of the forward nacelle portion, to the translatable sleeve, and to the aft end of the VAFN airfoil. When the VAFN airfoil is in the VAFN flow position, the VAFN airfoil is moved aft to a position away from the translatable sleeve to create an opening between the translatable sleeve and the VAFN airfoil, such that an airflow in the bypass duct is split into a flow through the bypass duct and a flow that may exit the bypass duct through the opening. Lastly, when the VAFN airfoil is in the thrust reverse position, the VAFN airfoil and the translatable sleeve are moved aft to a position away from the aft edge of the forward nacelle portion to expose a cascade array comprising an opening in the bypass duct, and one or more blocker doors are deployed so as to move from a position adjacent an inner surface of the VAFN airfoil to a position that extends into the bypass duct, such that at least a portion of the airflow in the bypass duct is directed out the bypass duct through the cascade array.

Other features and advantages of the present invention should be apparent from the following description of the preferred embodiments, which illustrate, by way of example, the principles of the invention.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the invention.

DETAILED DESCRIPTION

In the following description, various embodiments will be described. For purposes of explanation, specific configurations and details are set forth in order to provide a thorough understanding of the embodiments. It will also be apparent to one skilled in the art that the present invention can be practiced without the specific details described herein. Furthermore, well-known features may be omitted or simplified in order not to obscure the embodiment being described.

FIGS. 1-7 show a nacelle assembly and integrated variable area fan nozzle and thrust reverser assembly according to a first embodiment.

Figure 1:
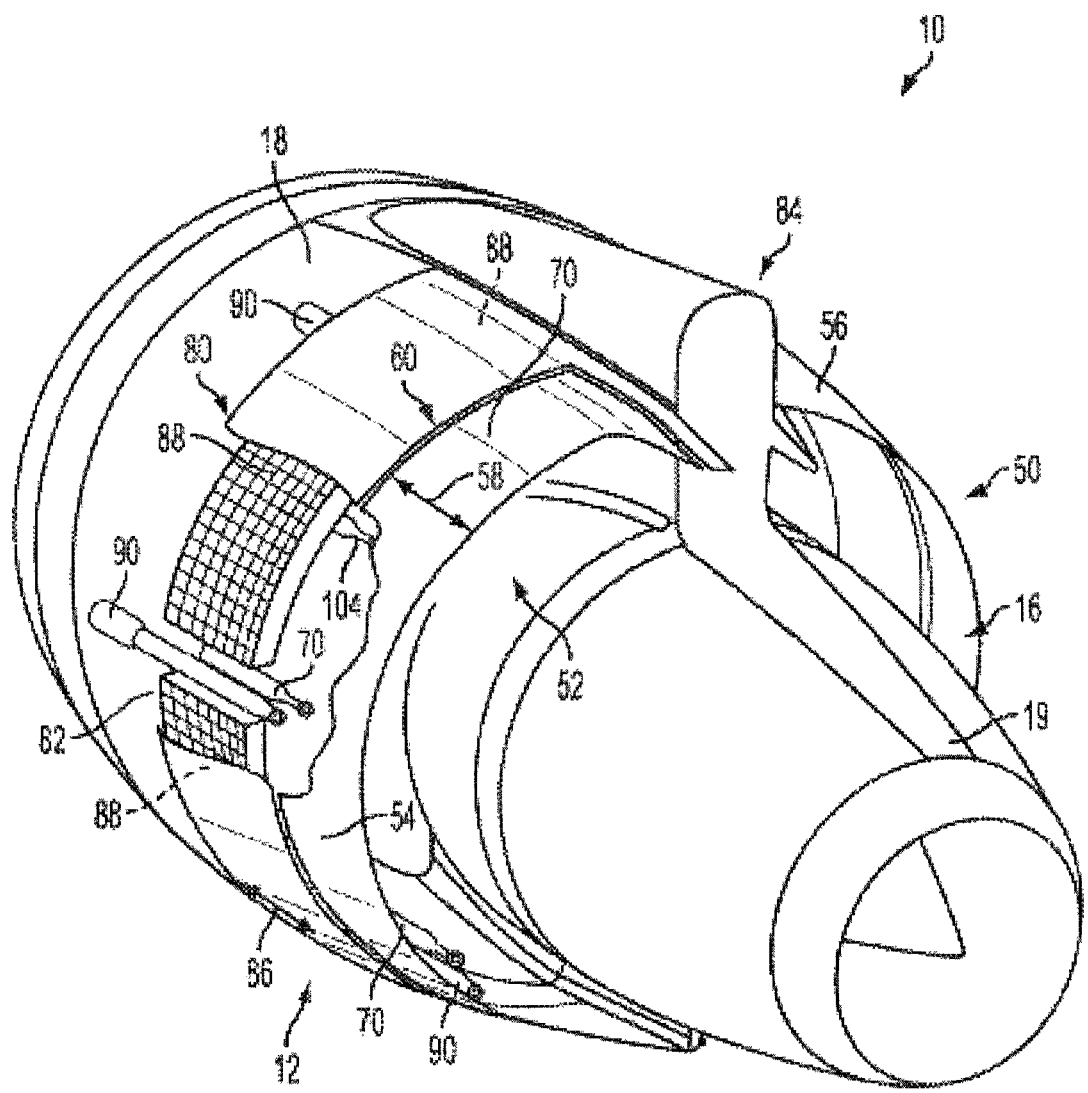
FIG. 1 illustrates an aircraft engine having a trailing edge variable area nozzle assembly according to a first embodiment of the invention.
Figure 2:
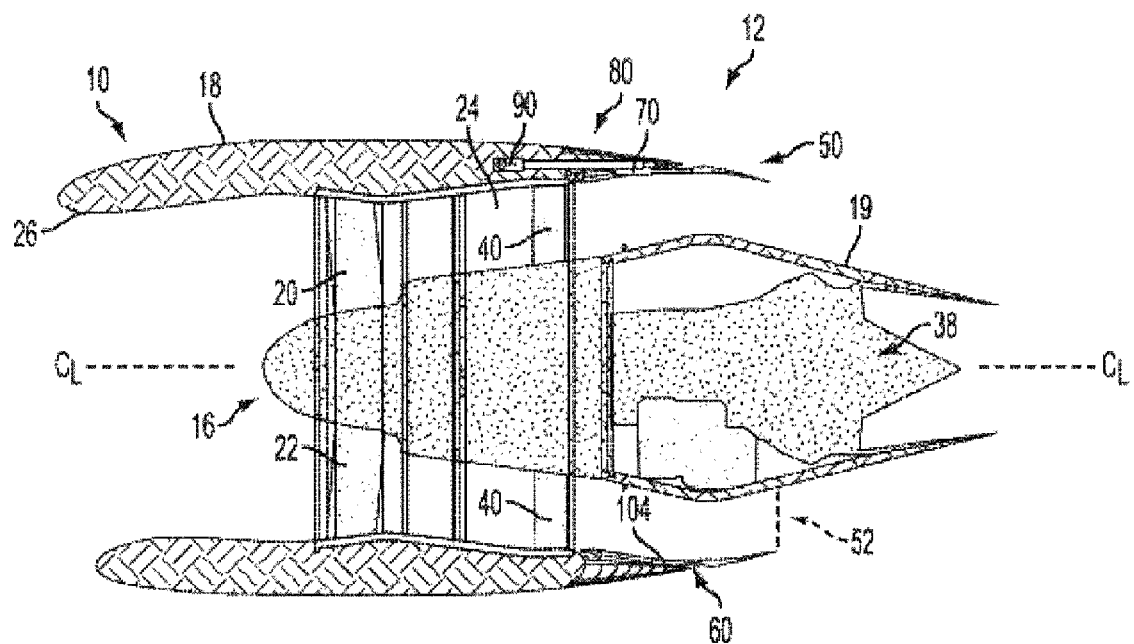
FIG. 2 is a partially schematic section view of the aircraft engine according to the first embodiment.

Referring to FIGS. 1 and 2, the engine 10 includes a trailing edge variable area fan nozzle (VAFN) assembly 12 having a translating ring assembly 50 that may be adjusted, for example, as the engine 10 operates under varying flight conditions. As stated, such an adjustment can cause a shift in the engine's operating line. The translating ring assembly 50 is translated (i.e., variably moved forward and aft) to vary the nozzle exit area in order to optimize engine operation and to adjust an amount of engine bypass flow spilled through an upstream exit in the nozzle assembly 12. By bleeding or spilling off excess fan flow through the upstream exit of the nozzle assembly 12, lower fan pressure ratios for the same amount of delivered mass flow can be obtained, thereby increasing stall margins and avoiding engine malfunction and shutdown. For purposes of illustration, the exemplary variable area fan nozzle assembly 12 of the embodiment is shown in the context of a gas turbine jet aircraft engine. The engine 10 may be mounted to a wing or fuselage of an aircraft, for example, by a pylon or other, similar support.

The engine 10 includes an engine core 16 and a nacelle 18. The engine core 16 is housed in a core cowl 19. As shown in FIG. 2, a fan 20 is mounted adjacent to an upstream end of the nacelle 18, and includes a series of fan blades 22 that are rotated about the engine centerline $C_L$ during engine operation so as to draw a flow of air into and past an inlet end of the nacelle 18. An annular bypass duct 24 is defined between the engine core 16 and the nacelle 18. The air flow drawn into the engine 10 is accelerated by the rotating fan blades 22. A portion of the air flow is directed into and through a compressor within the engine core 16. The air flow through the engine core 16 is initially passed through the compressor to increase the air flow pressure, after which the pressurized air is passed through a combustor (not shown), where it is mixed with fuel and ignited. The combustion of the fuel and air mixture within the combustor causes the air to expand which in turn drives a series of turbines at the rear of the engine, indicated generally at 38, to rotate and in turn to provide power to the fan 20.

The bypass flow accelerated by the rotating fan blades 22 passes through the bypass duct 24, past stators 40, and out through the nozzle assembly 12. The bypass flow provides the main engine thrust. The high pressure heated exhaust gases from the combustion of the fuel and air mixture are directed through the nozzle assembly 12 out of the rear of the engine core 16.

Figure 3:
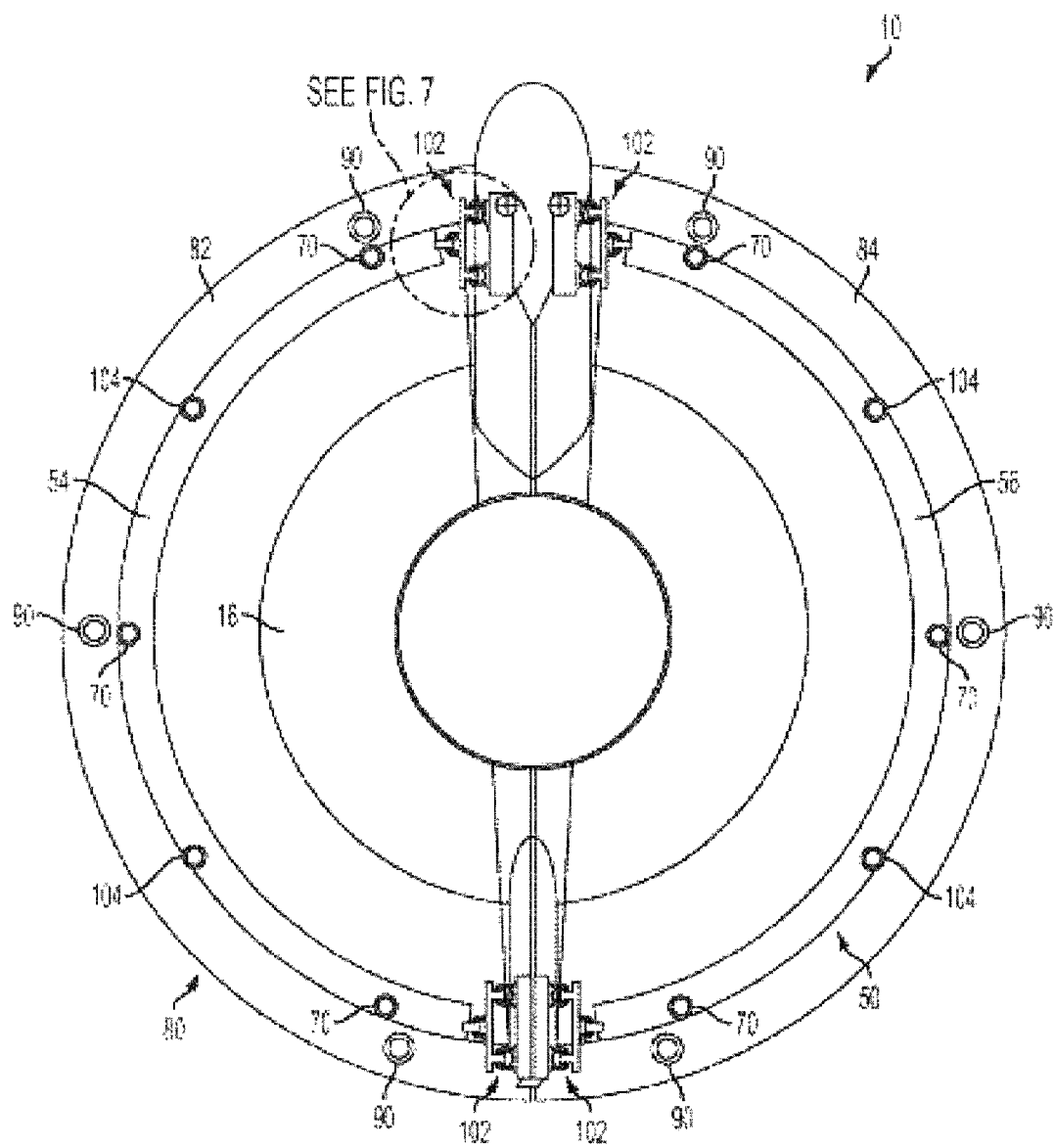
FIG. 3 is an end view of the nozzle end of the engine according to the first embodiment.

The translating ring assembly 50 can be a ring-like annular airfoil structure mounted at the trailing end of a thrust reverser 80, adjacent to and circumscribing the engine core cowl 19. The area between the trailing edge of the ring assembly 50 and the core cowl 19 defines the nozzle exit area 52 for the nozzle assembly 12. As shown in FIGS. 1 and 3, the ring assembly 50 can comprise an arcuate first ring section 54 and an arcuate second ring section 56, each ring section 54, 56 being axially translatable in the direction of the bidirectional arrow 58. Translation of the ring assembly 50 effects a desired size of an upstream exit 60 and varies the outlet geometric and exit area 52 of the nozzle 12 outlet for the engine bypass flow. The ring assembly 50 can be translated, for example, by a plurality of ring actuators 70.

The thrust reverser 80 may be adjacent to and forward of the translating ring assembly 50 to block and redirect the bypass flow in the bypass duct 24 into a thrust reversing vector. In FIG. 1, the thrust reverser 80 and the translating ring assembly 50 are in stowed or closed positions. The thrust reverser 80 can comprise an arcuate first sleeve or cowl section 82 and an opposed arcuate second sleeve or cowl section 84 (shown in FIG. 3). The thrust reverser sleeve sections 82, 84 can be axially translatable in the direction of the bidirectional arrow 86 by a plurality of sleeve actuators 90. The thrust reverser sleeve sections 82, 84 are translatable over a series of cascade vanes 88. The cascade vanes 88 are indicated by dashed lead lines in FIG. 1 because they are not visible when the thrust reverser 80 is in the stowed position. Axial translation of the sleeve sections 82, 84 in the fore and aft directions allows the bypass air flow to be passed through the cascade vanes 88 to generate a thrust-reversing vector.

FIG. 3 is a partial section view of the aft end of the engine 10, and illustrates the arrangement of the ring and sleeve actuators 70 and 90, respectively, around the periphery of the engine 10. As shown in FIG. 1, and more clearly in FIG. 3, the sleeve half section 82 and the ring half-section 54 cooperate to generally define an approximately 180 degree sector of the combined thrust reverser and translating ring structure. Likewise, a sleeve half section 84 and a ring half section 56 cooperate to generally define an opposed approximately 180 degree sector of the thrust reverser and translating ring structure. Together, these approximate 180 degree sectors cooperate to define the entire approximate 360 degree thrust reverser-translating ring structure.

Figure 7:
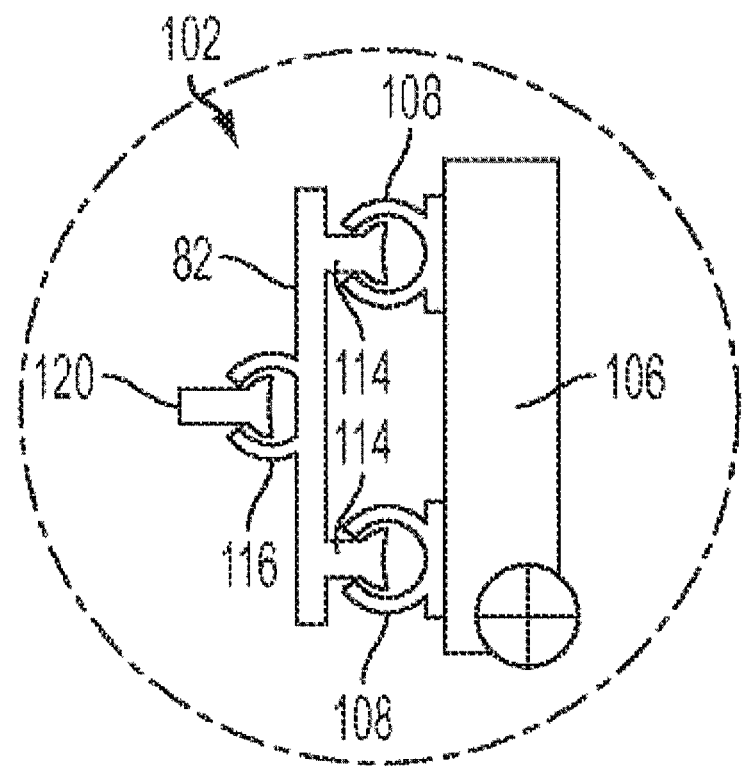
FIG. 7 is a partially schematic isolated view of a guide structure of the variable area nozzle assembly according to the first embodiment.

In the embodiment shown in FIGS. 1-3, each thrust reverser sleeve half-section 82, 84 of the thrust reverser 80 can be translatable by one or more (three are shown) peripherally spaced sleeve actuators 90 fixedly mounted in the nacelle 18. In the embodiment shown, three actuators 90 are used for each sleeve half-section 82, 84. Each half-section 54, 56 of the translating ring assembly 50 similarly can be translated by one or more (three are shown) peripherally spaced ring actuators 70. Ring actuators 70 can be mounted on an adjacent thrust reverser sleeve section 82, 84, respectively. The ring actuators 70 could be powered by, for example, electricity, mechanical, pneumatics, hydraulics, or other means, with appropriate power cables and conduits (not shown) passing via pre-defined passages between or above the thrust reverser cascade boxes or pivot doors. The number and arrangement of ring and sleeve actuators 70, 90 may be varied, for example, according to the thrust reverser and ring assembly configuration, and according to other factors. The ring sections 54, 56 may be mounted in, for example, upper and lower guide structures 102 located at each end of corresponding sleeve sections 82, 84, respectively. FIG. 7 is an isolated view of a guide structure 102. Guide tubes 104 may be mounted in the nacelle 18 and may extend into the ring sections 54, 56 to stabilize the sections 54, 56 against undesirable translation and/or vibration. Guide tubes may alternatively be mounted in the thrust reverser 80.

The translating ring assembly 50 may be a continuous (e.g., one-piece) or, as shown in FIG. 3, a continuing (e.g., split or multi-section) generally annular ring having an airfoil cross section. The upstream exit 60 (formed when the ring assembly 50 moves in the aft direction away from the sleeve sections 82, 84) therefore can have the form of a generally annular gap extending around the perimeter of the rear of the nacelle 18. Other outlet shapes can also be used, e.g., oval, and the like. The generally annular gap between the ring sections 54, 56 and the sleeve sections 82, 84 can be continuous, for example, or interrupted at one or more locations, such as, for example, at points of bifurcation or other separation of the ring assembly 50. The bypass duct 24 may also be interrupted at one or more locations.

The translating ring assembly 50 and surrounding structure are described below with reference to FIGS. 4-7. In FIGS. 4-7, elements that are obscured or partially obscured due to intervening elements are indicated by dashed lead lines.

Figure 4:
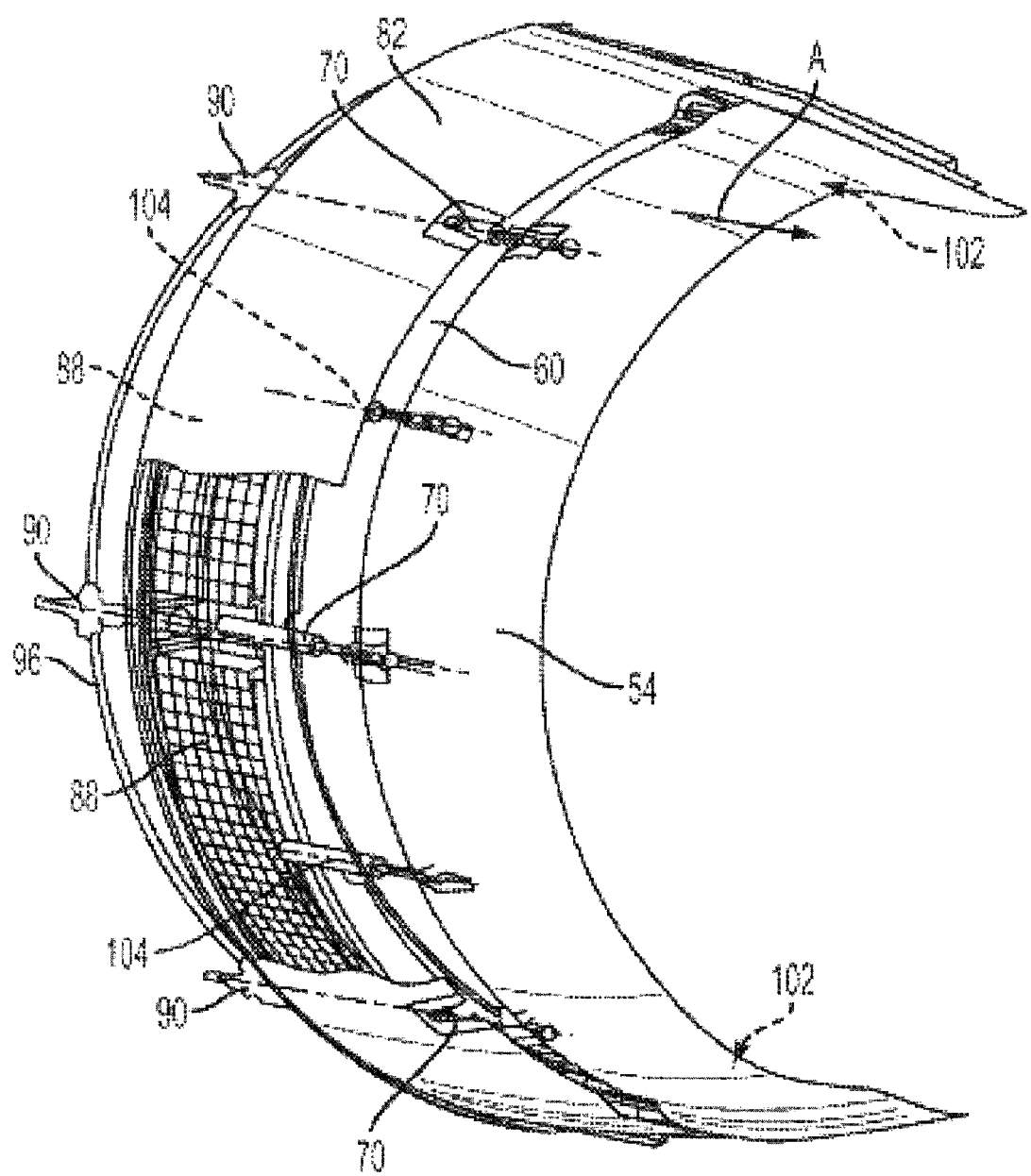
FIG. 4 is a partially schematic section view of the variable area nozzle assembly portion according to the first embodiment.

FIG. 4 is a partial view of the mounting structure for a first ring section 54 of the translating ring assembly 50 and the corresponding, adjacent first sleeve section 82 of the thrust reverser 80. The second ring section 56 of the translating ring assembly 50 and the second sleeve section 84 of the thrust reverser 80, which are shown in FIGS. 1 and 3, can be mounted in a similar manner. In FIG. 4, the thrust reverser 80 is in a stowed position, covering the cascade vanes 88. The translating ring assembly 50 is in an open or deployed position so that an upstream exit 60 is defined between the first ring section 54 and the first sleeve section 82. The rearward axial translation of the first ring section 54 to the deployed position is indicated by the arrow A. The ring actuators 70 can extend from the sleeve section 82, across the upstream exit 60, and connect to a fore end of the ring section 54. The guide tubes 104 can also extend from the sleeve section 82, across the upstream exit 60, and connect to the fore end of the ring section 54. A sleeve actuation cable 96 can connect to each sleeve actuator 90 for power and to provide simultaneous actuation of each actuator 90.

Figure 5:
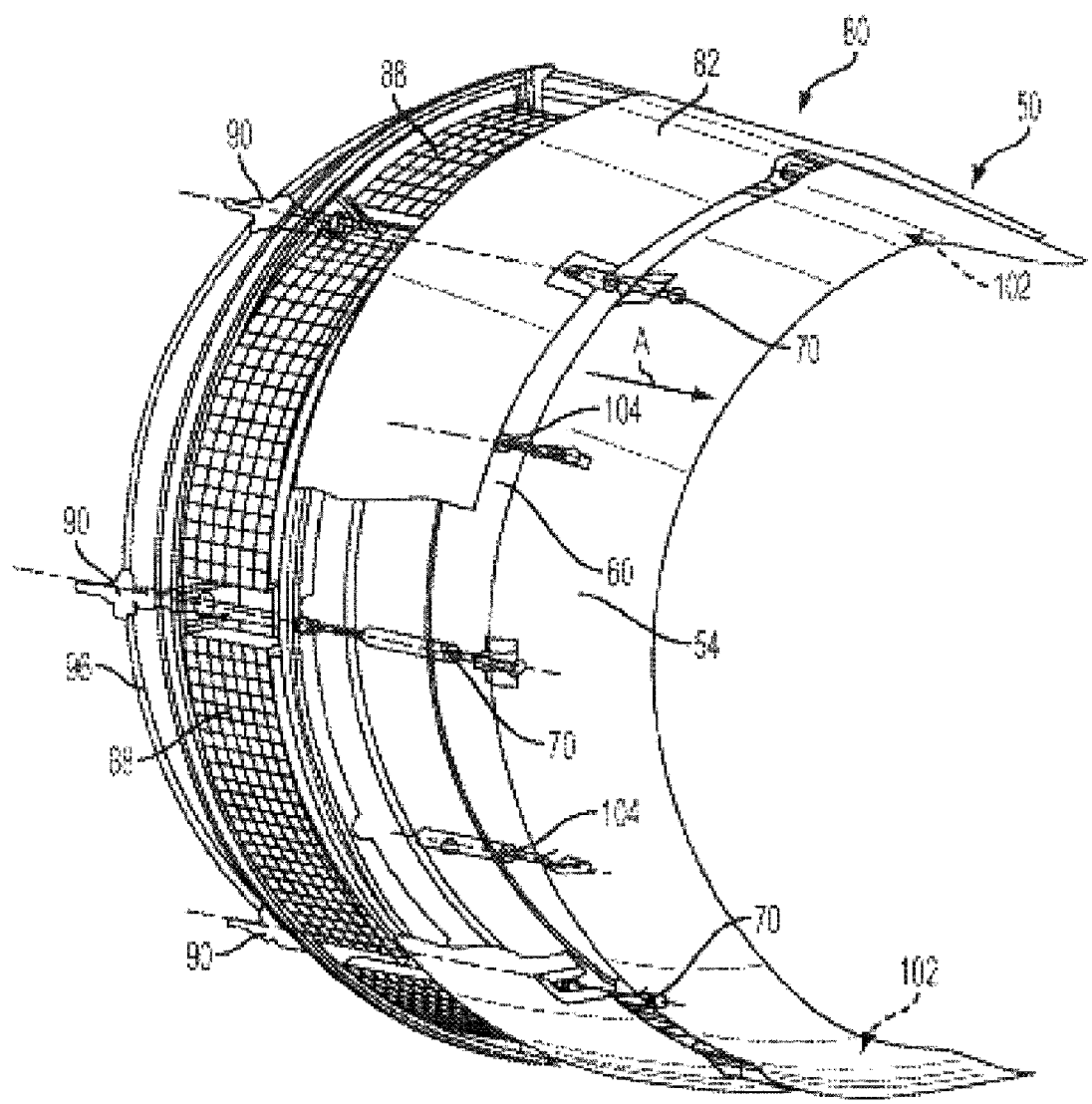
FIG. 5 is another partially schematic section view of the variable area nozzle assembly according to the first embodiment.

FIG. 5 shows the thrust reverser 80 in a deployed position and the translating ring assembly 50 in the open position. The rearward axial translation of the first sleeve section 82 from the position shown in FIG. 4 to the deployed position is indicated by the arrow A in FIG. 5. Rearward translation of the sleeve section 82 exposes the cascade vanes 88 during operation of the thrust reverser 80. The ring section 54 can also be translated rearwardly during operation of the thrust reverser 80, as shown in this embodiment. Translation of the ring section 54 at the same time that the thrust reverser 80 is deployed, may be optional because the bypass flow is rerouted through the cascade vanes 88.

Figure 6:
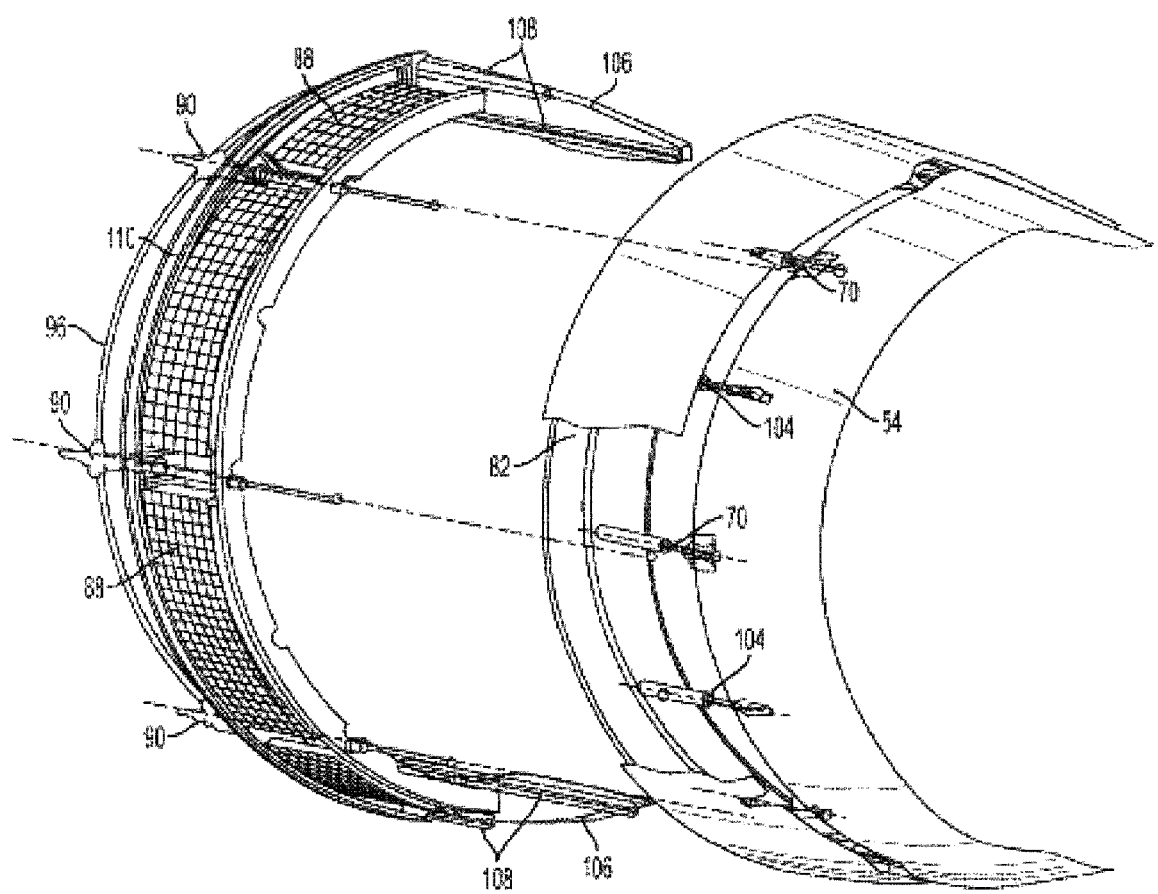
FIG. 6 is a partially schematic, exploded section view of the variable area nozzle assembly according to the first embodiment.

FIG. 6 is a partial, exploded view with the first sleeve section 82 and its corresponding first ring section 54, illustrated separate from the surrounding mounting structure.

FIG. 7 is a partial section isolated view taken through one of the guide structures 102. Referring generally to FIGS. 3 and 6 and particularly to FIG. 7, in the guide structure 102, a beam 106 can be fixedly attached to a transverse bulkhead 110 (FIG. 6) that extends 180 degrees and can include axially (e.g., parallel to the centerline of the engine 10) extending guide tracks 108 attached thereto. The bulkhead 110 may be integral with or otherwise fixedly mounted to the engine nacelle 18 (FIG. 1). The thrust reverser sleeve section 82 can be connected to axially extending track bars 114 (FIG. 7) that are slidably received within the guide tracks 108 of the fixed beam 106. The thrust reverser sleeve section 82 is thereby slidably mounted with respect to the nacelle 18. The thrust reverser sleeve section 82 can also include an axially extending track guide 116 in which a translating ring track bar 120 is slidably received. The translating ring track bar 120 can be connected to the first ring section 54, and the ring section 54 axially translates as the track bar 120 slides within the track guide 116. The ring section 54 is thereby slidably mounted with respect to the sleeve section 82 of the thrust reverser 80. The translating sleeve section 82 and the track bar 120 can be powered through conventional means, such as mechanical, electric, hydraulic or pneumatic or other equivalent means.

Disclosed herein are embodiments of an integrated VAFN and thrust reverser assembly for an engine nacelle. As described further below, the integrated assembly can be moved between at least three positions: a stowed or "cruise" position, a VAFN flow position, and a deployed or thrust reverser position, and can be variably moved to a position anywhere in between end points of these three positions. The blocker doors that are associated with diverting the airflow from the bypass duct out through the cascade array for thrust reverse are attached to the airfoil of the integrated assembly, which is moved aft away from a forward portion of the engine nacelle when the engine operation is changed from the stowed operation to the VAFN flow or the thrust reverse operation. That is, the blocker doors are carried by the airfoil, so that moving the airfoil aft carries the blocker doors with the airfoil. In changing the engine operation from cruise operation to VFAN operation, the airfoil is moved aft, but the blocker doors are not deployed. In changing the engine from cruise operation to thrust reverse operation, or changing the engine from VFAN operation to thrust reverse operation, the blocker doors are deployed after the airfoil is moved aft away from the forward portion of the engine nacelle. The integrated assembly can be constructed so that a single actuator both moves the airfoil and deploys the blocker doors, or the integrated assembly can be constructed so that independent actuators move the airfoil and deploy the blocker doors. The cascade array through which the airflow is diverted can be constructed to translate (move aft) with deployment of the blocker doors, or the cascade array can be constructed to remain fixed, such that a panel is moved with deployment of the blocker doors to uncover the cascade array and permit airflow out of the bypass duct for thrust reverse operation.

Figure 8:
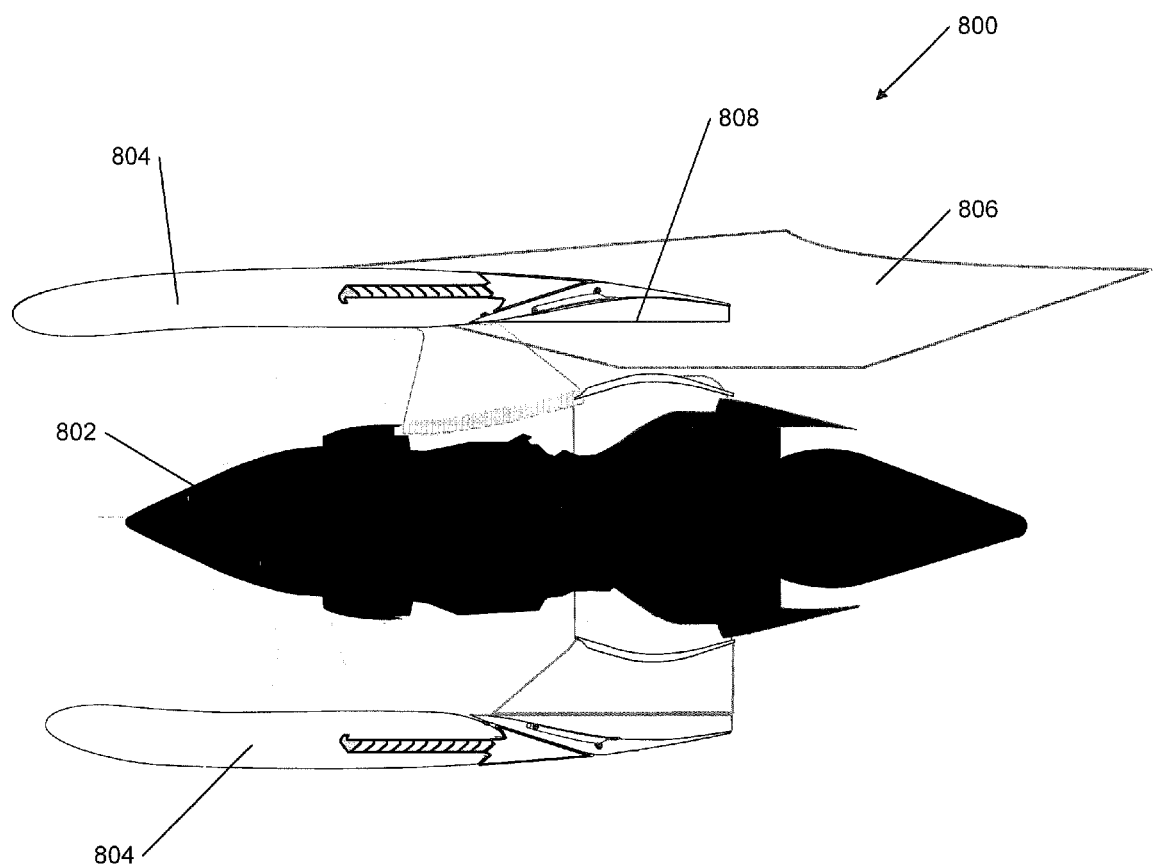
FIG. 8 is a partially schematic section view of an integrated VAFN and thrust reverser assembly according to an embodiment, in a stowed position.

FIG. 8 is a partially schematic section view of the integrated VAFN and thrust reverser assembly 800 according to an embodiment, shown in a stowed position. The stowed position is also referred to as "cruise mode" for the engine. As shown in FIG. 8, a turbofan engine 802 is located within a nacelle 804. FIG. 8 also shows that the integrated VAFN and thrust reverser assembly 800 is mounted to an aircraft pylon 806. As described further below, the assembly 800 components move aft by moving along pylon-mounted tracks, or rails 808.

Figure 9:
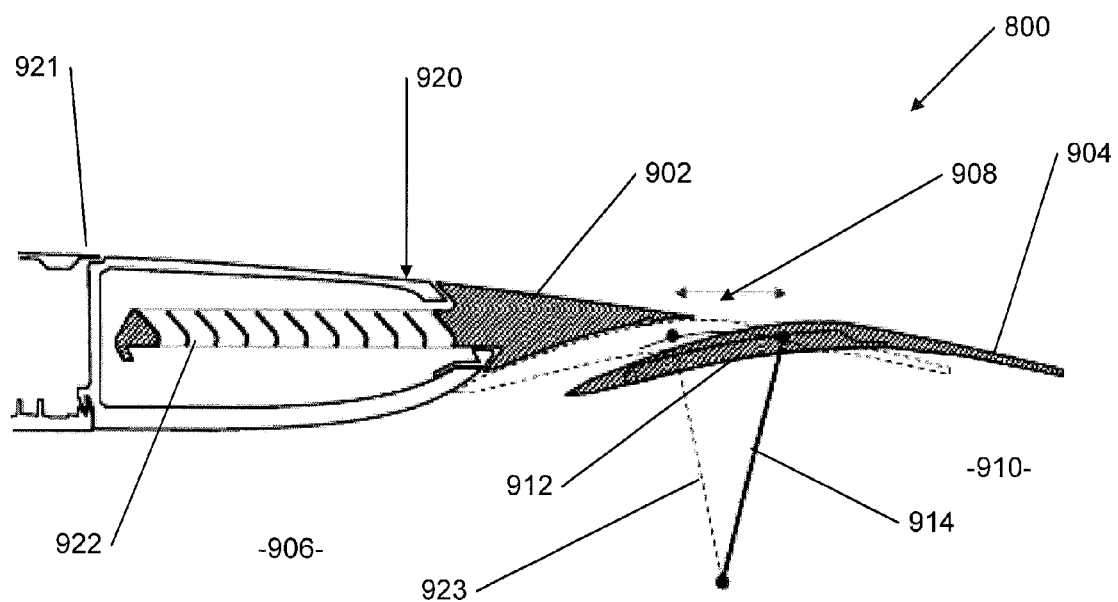
FIG. 9 is a partially schematic section view of the integrated VAFN and thrust reverser of FIG. 8 in the VAFN flow position.

FIG. 9 is a partially schematic section view of the integrated VAFN and thrust reverser assembly 800 of FIG. 8 in the VAFN flow position. FIG. 9 shows the assembly components of a translatable sleeve 902 and a VAFN airfoil 904. Details of the actuators are not illustrated in FIG. 9 for simplicity. In the VAFN flow position of FIG. 9, the VAFN airfoil 904 is moved aft to a position away from the translatable sleeve 902 as compared to the stowed position, to create an opening 908 between the translatable sleeve and the VAFN airfoil. When the opening 908 is created, the airflow in the bypass duct 906 is split into a flow through the bypass duct exit 910 and a flow that exits the bypass duct through the opening 908. Blocker doors 912 that are integrated into the airfoil 904 are shown in FIG. 9 as flush against an inside surface of the airfoil, to provide a smooth aerodynamic surface in the bypass duct. The blocker doors are held flush in position by drag links 914. Those skilled in the art will understand that, in the VAFN flow position of FIG. 9, the airfoil 904 is translated aft to create the passage 908 and provide an elongated airflow exit path. The elongated VAFN exit path avoids flow separation in the bypass duct 906 and maintains a desired cross section area increase for the airflow as it exits the opening 908. In the VAFN flow position of FIG. 9, the translatable sleeve 902 is maintained in a position flush against an aft end 920 of the nacelle portion 921 to which the translatable sleeve is coupled. A cascade array 922 is carried within the nacelle portion. A dashed line 923 in FIG. 9 indicates the position of the drag link 914 when the airfoil is moved forward toward the nacelle portion 921 for the stowed position.

Figure 10:
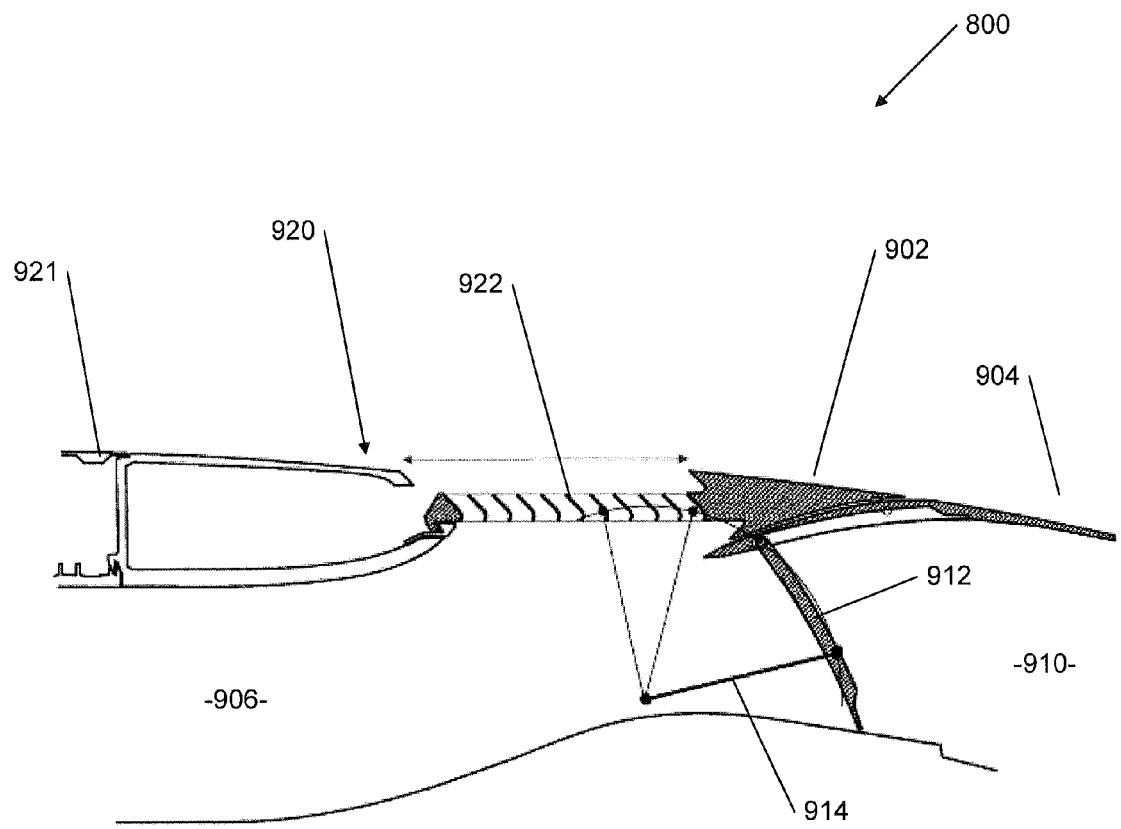
FIG. 10 is a partially schematic section view of the integrated VAFN and thrust reverser of FIG. 8 in the deployed thrust reverse position, with the blocker doors actuated by drag links.

FIG. 10 is a partially schematic section view of the integrated VAFN and thrust reverser 800 of FIG. 8 in the deployed position, with the blocker doors 912 actuated by drag links 914. As noted above, blocker doors in the integrated VAFN and thrust reverser described herein can be actuated by a separate actuator for moving the airfoil and an actuator for moving the blocker doors, or a single actuator can be used for both moving the airfoil and deploying the blocker doors. FIG. 10 shows a single actuator configuration. That is, a separate actuator is not used to deploy the blocker doors in FIGS. 9 and 10, rather, the drag links 914 deploy the blocker doors 912 as the airfoil 904 is moved aft by an actuator. It should be readily apparent from FIG. 9 and FIG. 10 that the VAFN airfoil is 904 enlarged as compared to a conventional airfoil construction. The illustrated airfoil construction is sized to provide stiffness that is sufficient to stabilize the airfoil 904 through its functions and to accommodate the blocker doors 912 so the doors are carried by the airfoil structure. The drag links 914 for the blocker door actuation are sized and located to accommodate travel of the airfoil without causing deployment of the blocker doors, until the thrust reverse operation. When the VAFN airfoil 904 is in the deployed or thrust reverse position, the VAFN airfoil 904 and the translatable sleeve 902 are moved aft to a position away from the aft edge of the forward nacelle portion to expose the cascade array 922, and the blocker doors 912 are deployed so as to move from a position adjacent an inner surface of the VAFN airfoil to a position that extends into the bypass duct 906, such that at least a portion of the airflow in the bypass duct is directed out of the bypass duct through the cascade array. Thus, the blocker doors 912 of the VAFN airfoil 904 are configured to move variably between a stowed position in which the blocker doors are radially adjacent a radially inner surface of the VAFN airfoil, and a deployed position in which the blocker doors are transverse to the radially inner surface of the airfoil. More particularly, the VAFN airfoil 904 is configured to move forward and aft axially along a centerline of the nacelle 804, and the blocker doors 912 are configured to move with the VAFN airfoil, as the airfoil moves axially forward and aft.

Figure 11:
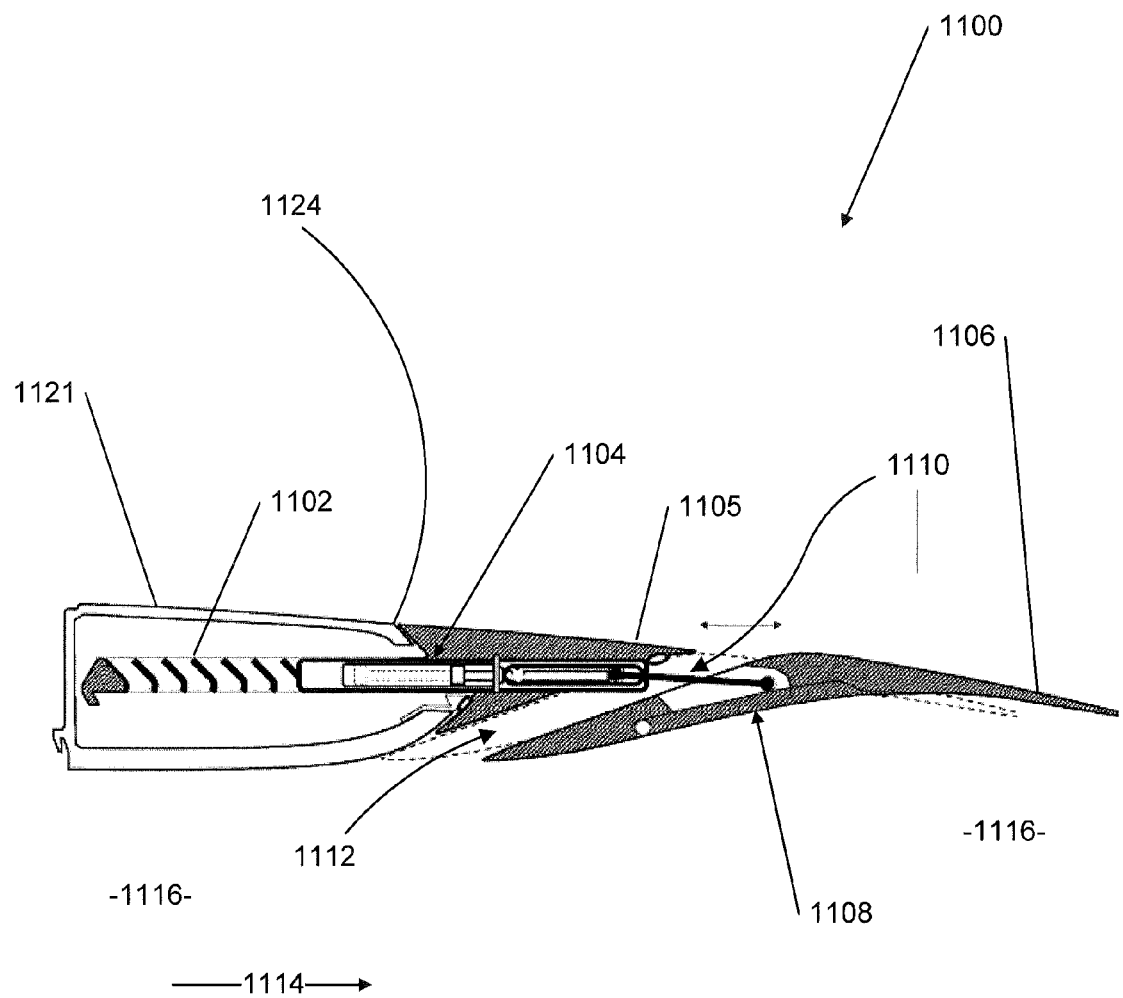
FIG. 11 is a partially schematic section view of an integrated VAFN and thrust reverser according to an alternative embodiment in the VAFN flow position, showing a linear actuator in the cascade array plane, configured for movement of the VAFN airfoil and the blocker doors.

FIG. 11 is a partially schematic section view of an integrated VAFN and thrust reverser assembly 1100 according to an alternative embodiment, shown in the VAFN flow position, using a single actuator for moving the translatable sleeve and deploying the blocker doors. Unlike the FIG. 9 and FIG. 10 embodiment, however, drag links are not used in the FIG. 11 embodiment. Rather, in the FIG. 11 embodiment, a single actuator is located in the plane of the cascade array, placed in the translatable sleeve or in the fixed structure. The integrated assembly 1100 shown in FIG. 11 includes a cascade array 1102 and a linear actuator 1104 in the cascade array plane of the translatable sleeve 1105. As illustrated in FIG. 11, the cascade array plane lies within the nacelle portion 1121 to which the translatable sleeve 1105 is coupled. The linear actuator 1104 is configured for movement of the VAFN airfoil 1106 and one or more blocker doors 1108. A mechanism 1110 comprising sliders and couplings within the translatable sleeve 1105 provides a linkage that actuates the blocker doors and also permits moving the airfoil aft without deploying the blocker doors, for VAFN effects. It may be desirable to utilize separate devices to inhibit blocker door opening during VAFN effects. In the VAFN flow position shown in FIG. 11, the VAFN airfoil 1106 is moved aft (to the right in FIG. 11) away from the translatable sleeve 1105 to create an opening 1112 between the translatable sleeve and the VAFN airfoil 1106, such that an airflow 1114 in the bypass duct 1116 is split into a flow through the bypass duct and a flow that exits the bypass duct through the opening 1112.

Figure 12:
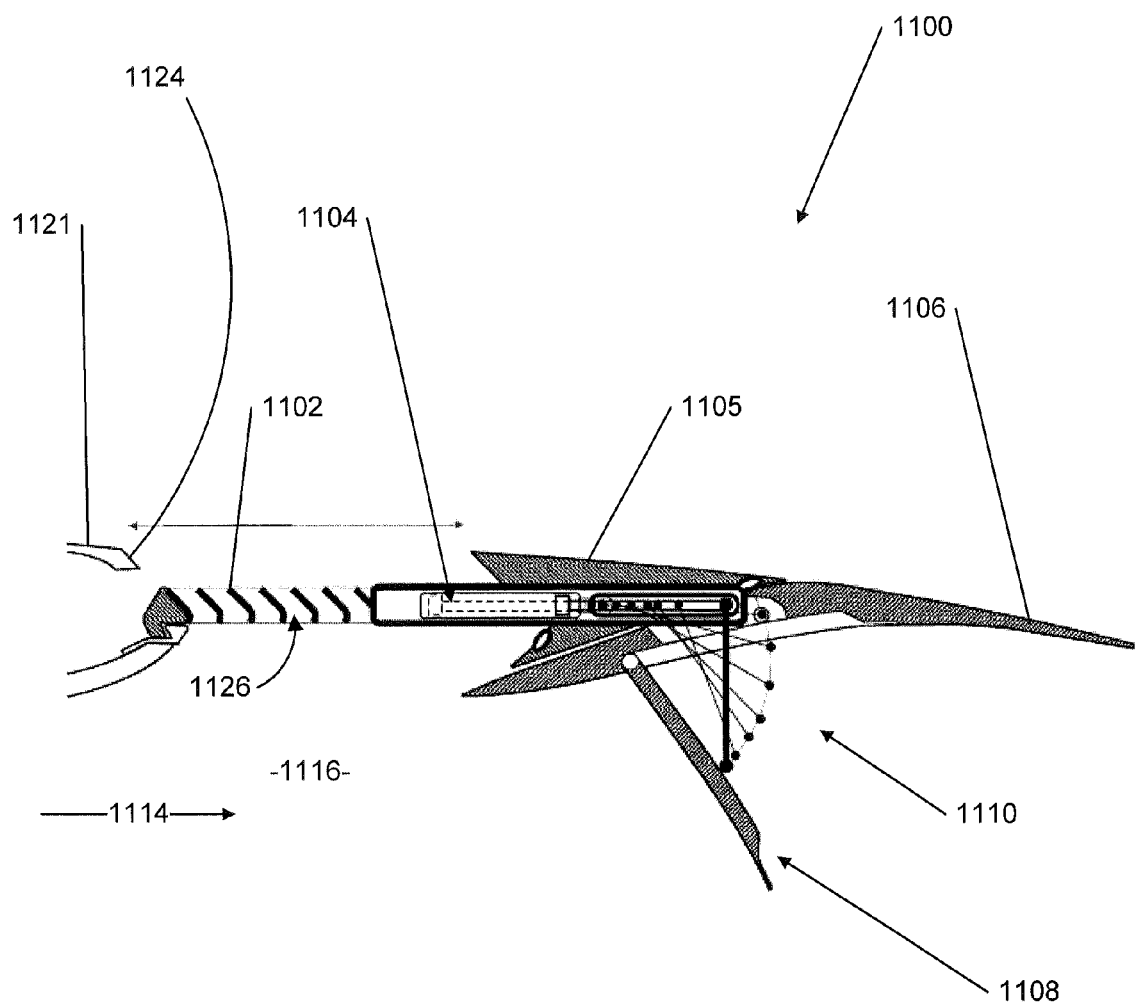
FIG. 12 is a partially schematic section view of the integrated VAFN and thrust reverser of FIG. 11 in the thrust reverse position.

FIG. 12 is a partially schematic section view of the integrated VAFN and thrust reverser of FIG. 11 in the thrust reverse position. The single actuator mechanism 1110 moves the airfoil 1106 aft and deploys the blocker doors 1108. The mechanism may be a single VAFN actuator device with an integral translating sleeve and cascade lock and release device, or may be a double-action device to either extend the VAFN foil and/or deploy the blocker doors. FIG. 12 shows that the cascade array 1102 moves with the translatable sleeve 1105 and the mechanism 1110 automatically deploys the blocker doors 1108 that are integrated into the VAFN airfoil. When the VAFN airfoil 1106 and the translatable sleeve 1105 are moved away from the aft edge 1124 of the forward nacelle portion 1121 to expose the cascade array 1102, the blocker doors 1108 are deployed by the mechanism 1110. That is, moving the assembly 1100 to the thrust reverse position moves the blocker doors from a position adjacent an inner surface of the VAFN airfoil, in the stowed or VAFN flow position of FIG. 11, to a deployed position that extends into the bypass duct 1116. The thrust reverse position directs the airflow in the bypass duct out the bypass duct through the cascade array 1102, as indicated by the arrow 1126 in FIG. 12. The actuator mechanism 1110 is depicted in multiple positions to indicate the movement of the actuator 1104 and concomitant deployment of the blocker doors 1108.

Figure 13:
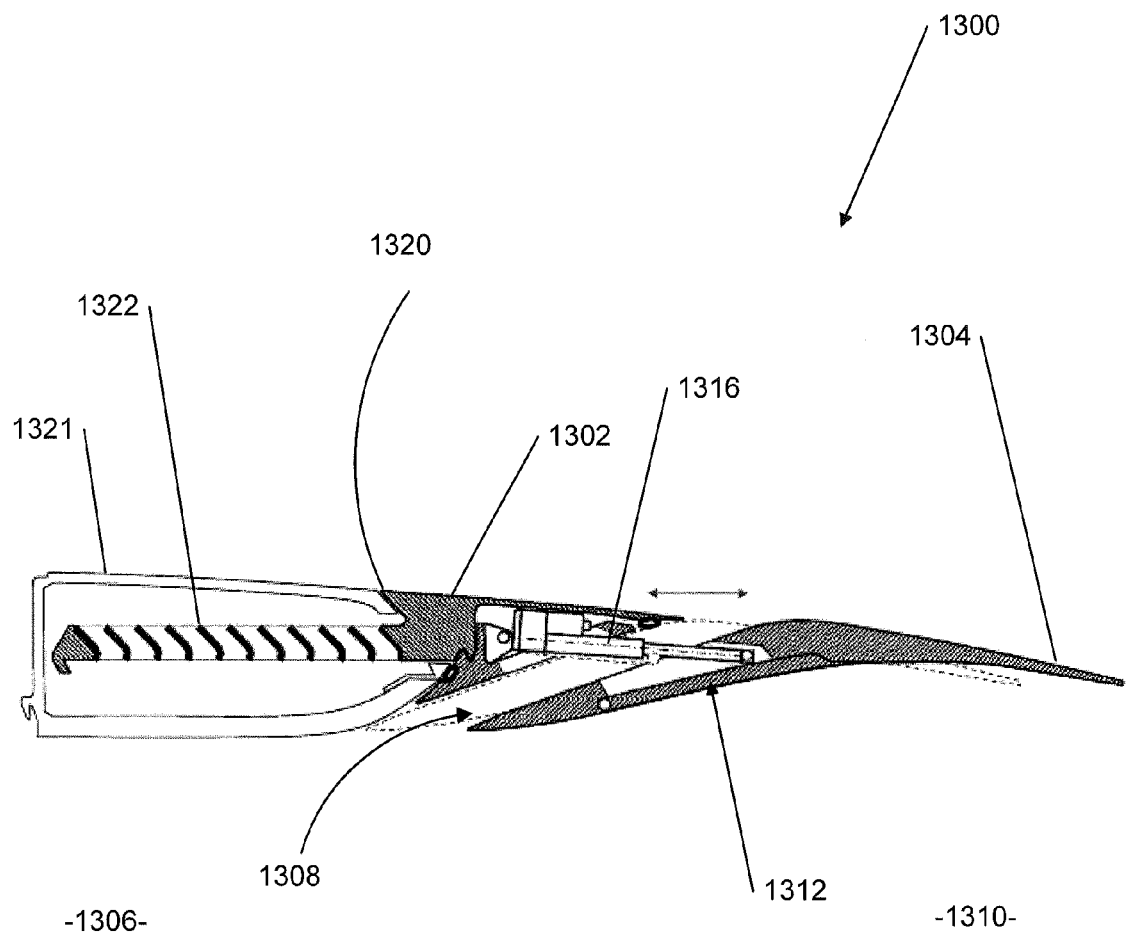
FIG. 13 is a partially schematic section view of an integrated VAFN and thrust reverser according to an alternative embodiment in the VAFN flow position, showing a linear actuator in the translatable sleeve, configured for movement of the VAFN airfoil and the blocker doors.

FIG. 13 is a partially schematic section view of an integrated VAFN and thrust reverser assembly 1300 according to an alternative embodiment in the VAFN flow position. FIG. 13 shows the assembly in the VAFN flow position, with components of a translatable sleeve 1302 and a VAFN airfoil 1304. The FIG. 13 embodiment includes blocker doors 1312 that are deployed by a mechanism 1316 solely adapted for the blocker doors. In FIG. 13, for example, electric motors are located in the translatable sleeve 1302, with a separate mechanism for moving the translatable sleeve itself. The mechanism for moving the translatable sleeve is not illustrated in FIG. 13 for simplicity, but those skilled in the art will understand that actuators such as the linear actuators 1104 illustrated in FIG. 11 may be adapted for moving the translatable sleeve, without a linkage that acts on the blocker doors. In the VAFN flow position shown in FIG. 13, the VAFN airfoil 1304 is moved aft to a position away from the translatable sleeve 1302 to create an opening 1308 between the translatable sleeve and the VAFN airfoil, such that the airflow in the bypass duct 1306 is split into a flow through the bypass duct exit 1310 and a flow that may exit the bypass duct through the opening 1308. The blocker doors 1312 that are integrated into the airfoil 1304 are shown flush against an inside surface of the airfoil, to provide a smooth aerodynamic surface in the bypass duct 1306.

Figure 14:
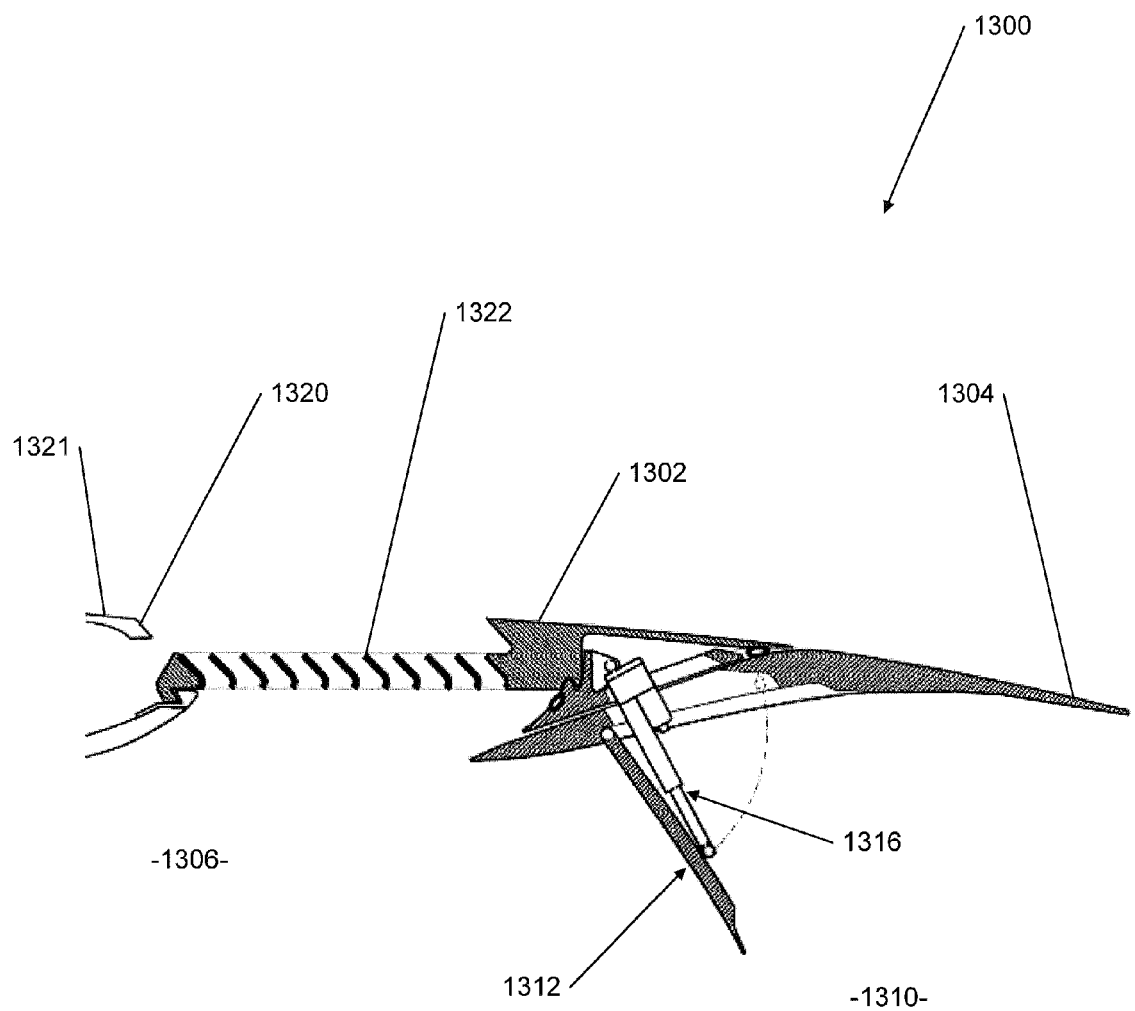
FIG. 14 is a partially schematic section view of the integrated VAFN and thrust reverser of FIG. 13 in the thrust reverse position.

FIG. 14 is a partially schematic section view of the integrated VAFN and thrust reverser of FIG. 13 in the thrust reverse position. In the thrust reverse position of FIG. 14, the translatable sleeve 1302 is positioned away from the aft end 1320 of the nacelle portion 1321 to which the translatable sleeve 1302 is coupled. A cascade array 1322 that is carried within the nacelle portion is exposed by movement of the translatable sleeve away from the nacelle portion 1321. The mechanism 1316 located in the translatable sleeve 1302 comprises electric motors, one for each blocker door, configured for causing movement of the blocker doors 1312. In the cross-section of FIGS. 10-14, only one of the blocker doors is shown, but those skilled in the art will understand that multiple blocker doors are distributed around the circumference of the nacelle. FIG. 14 shows that the electric motors 1316 deploy the blocker doors 1312 into the bypass duct, causing a portion of the air flow to exit the bypass duct through the cascade array 1322.

Figure 15:
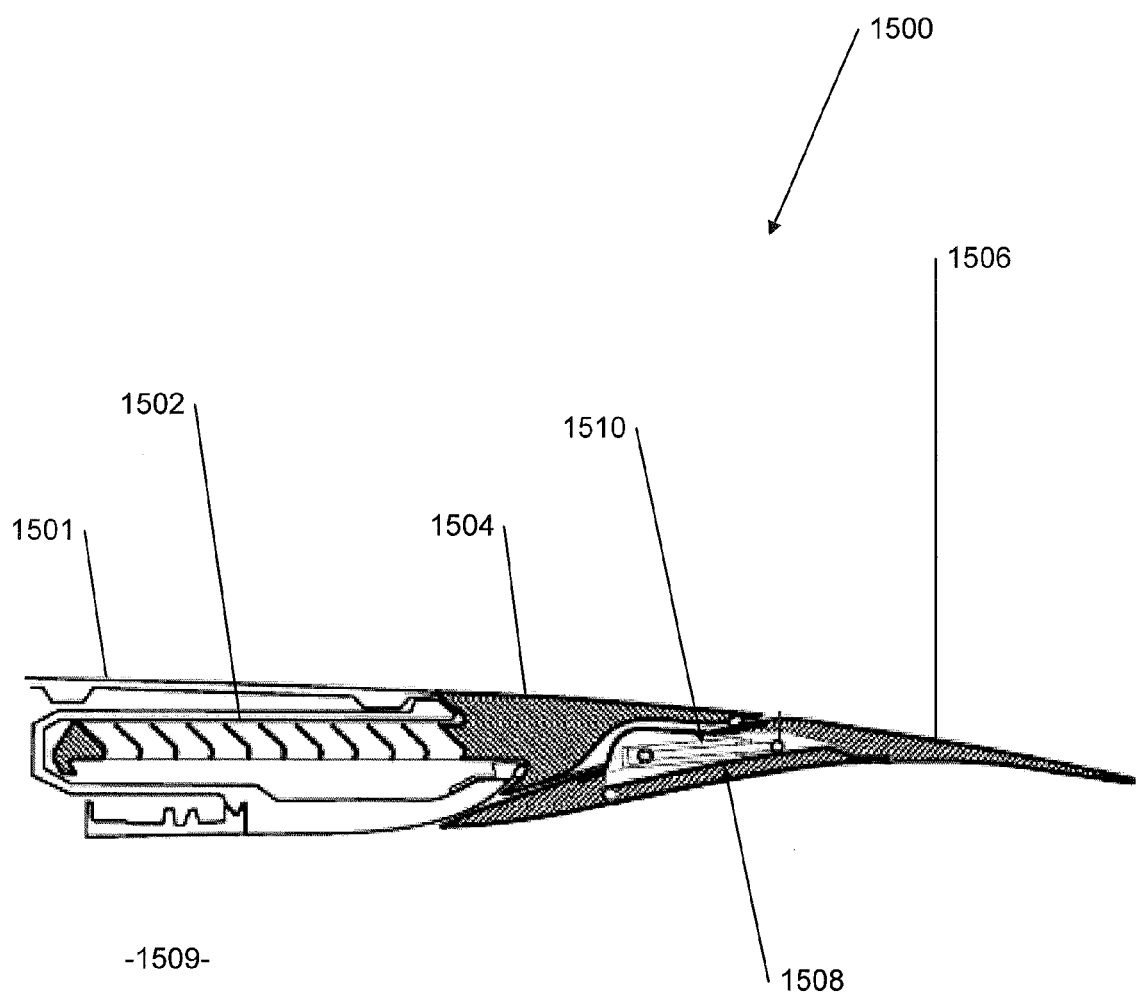
FIG. 15 is a partially schematic section view of an integrated VAFN and thrust reverser according to an alternative embodiment in the stowed position, showing a linear actuator in the VAFN airfoil, configured for movement of the VAFN airfoil and the blocker doors.

FIG. 15 is a partially schematic section view of an integrated VAFN and thrust reverser assembly 1500 according to an alternative embodiment, in the stowed position. In FIG. 15, the integrated assembly 1500 includes a nacelle portion 1501 and cascade array 1502 in a translatable sleeve 1504, and a VAFN airfoil 1506 with blocker doors 1508. The translatable sleeve 1504 is moved aft of the nacelle portion 1501 during operation, as described below. The blocker doors 1508 are shown flush against an inside surface of the airfoil, to provide a smooth aerodynamic surface in the bypass duct 1509 for the stowed position. The integrated assembly 1500 includes a deployment mechanism 1510 for deploying the blocker doors. The mechanism 1510 is carried in the airfoil 1506. Thus, the airfoil 1506 is configured with sufficient size and strength to support the blocker doors and the deployment mechanism. The deployment mechanism 1510 may comprise, for example, a hydraulic linear actuator or an electric motor. Thus, the FIG. 15 embodiment has separate, independent mechanisms for moving the translatable sleeve 1504 and for moving the blocker doors 1508. The mechanism for moving the translatable sleeve 1504 is not illustrated in FIG. 15 for simplicity, but those skilled in the art will understand that actuators such as the linear actuators 1104 illustrated in FIG. 11 may be adapted for moving the translatable sleeve, without a linkage that acts on the blocker doors.

Figure 16:
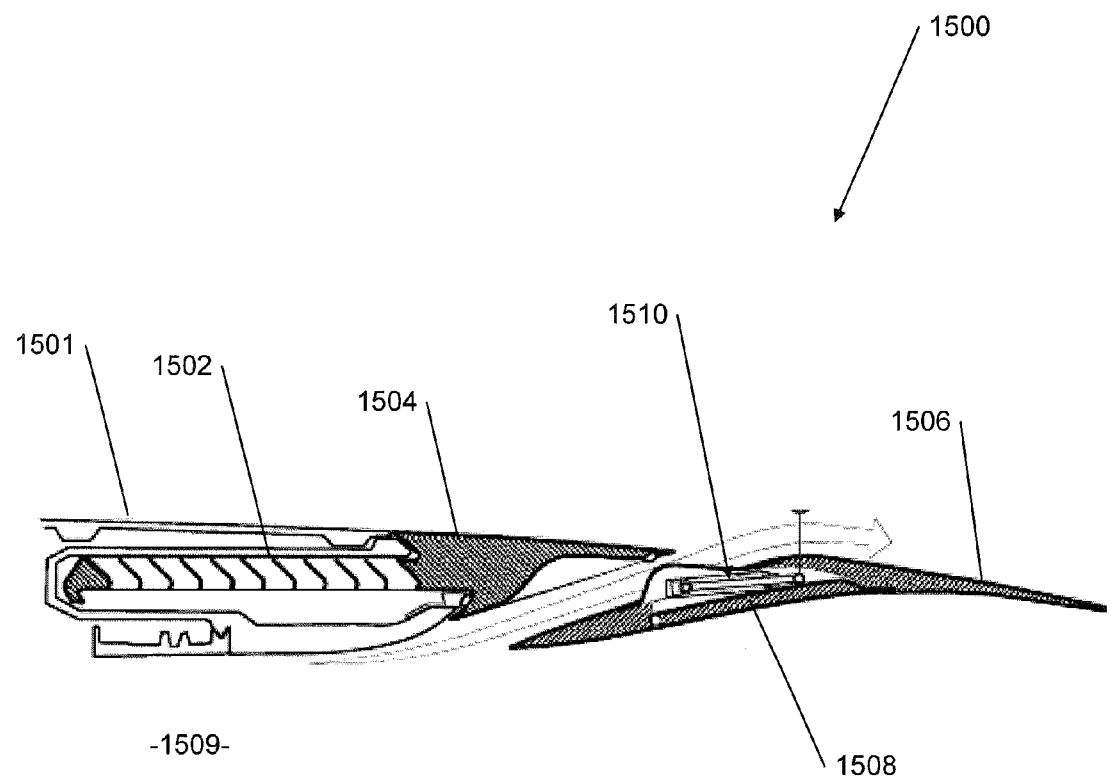
FIG. 16 is a partially schematic section view of the integrated VAFN and thrust reverser of FIG. 15 in the VAFN flow position.

FIG. 16 is a partially schematic section view of the integrated VAFN and thrust reverser assembly 1500 of FIG. 15 in the VAFN flow position. FIG. 16 shows that the airfoil 1506 is moved away from the nacelle portion 1501 for the VAFN flow position to create an opening between the airfoil 1506 and the translatable sleeve 1504, through which a portion of the airflow exits the bypass duct 1509. In the VAFN position of FIG. 16, the blocker doors 1508 are still positioned flush against an inside surface of the airfoil 1506, to provide a smooth aerodynamic surface in the bypass duct 1509.

Figure 17:
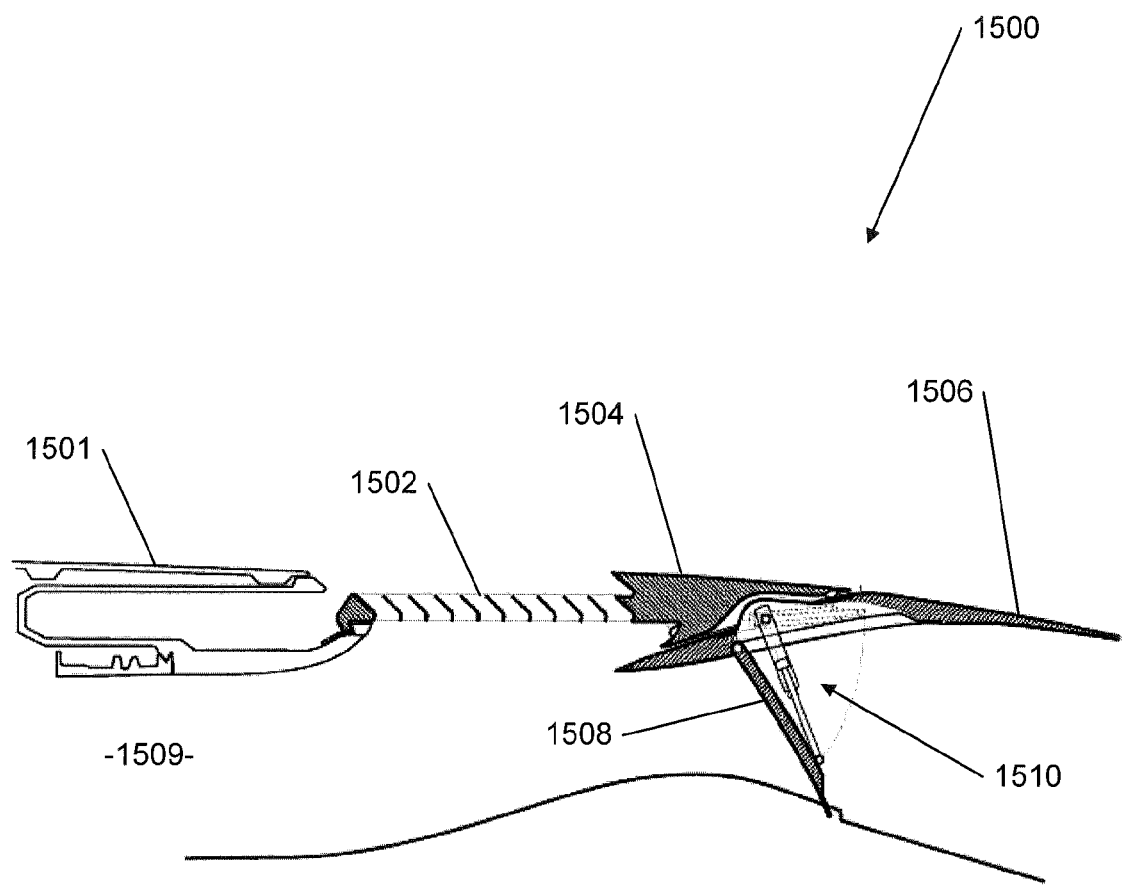
FIG. 17 is a partially schematic section view of the integrated VAFN and thrust reverser of FIG. 15 in the thrust reverse position.

FIG. 17 is a partially schematic section view of the integrated VAFN and thrust reverser assembly 1500 of FIG. 15 in the thrust reverse position. FIG. 17 shows that the translatable sleeve 1504 is moved away from the nacelle portion 1501 and carries the cascade array 1502 with it, thereby exposing the cascade array out from under the nacelle portion. As noted previously, the mechanism for moving the translatable sleeve 1504 is not illustrated in FIG.

17 for simplicity, but those skilled in the art will understand that actuators such as the linear actuators 1104 illustrated in FIG. 11 may be adapted for moving the translatable sleeve, without a linkage that acts on the blocker doors. FIG. 17 also shows the blocker doors 1508 having been deployed by the independent deployment mechanism 1510 into the bypass duct, causing a portion of the air flow to exit the bypass duct through the cascade array 1502.

Figure 18:
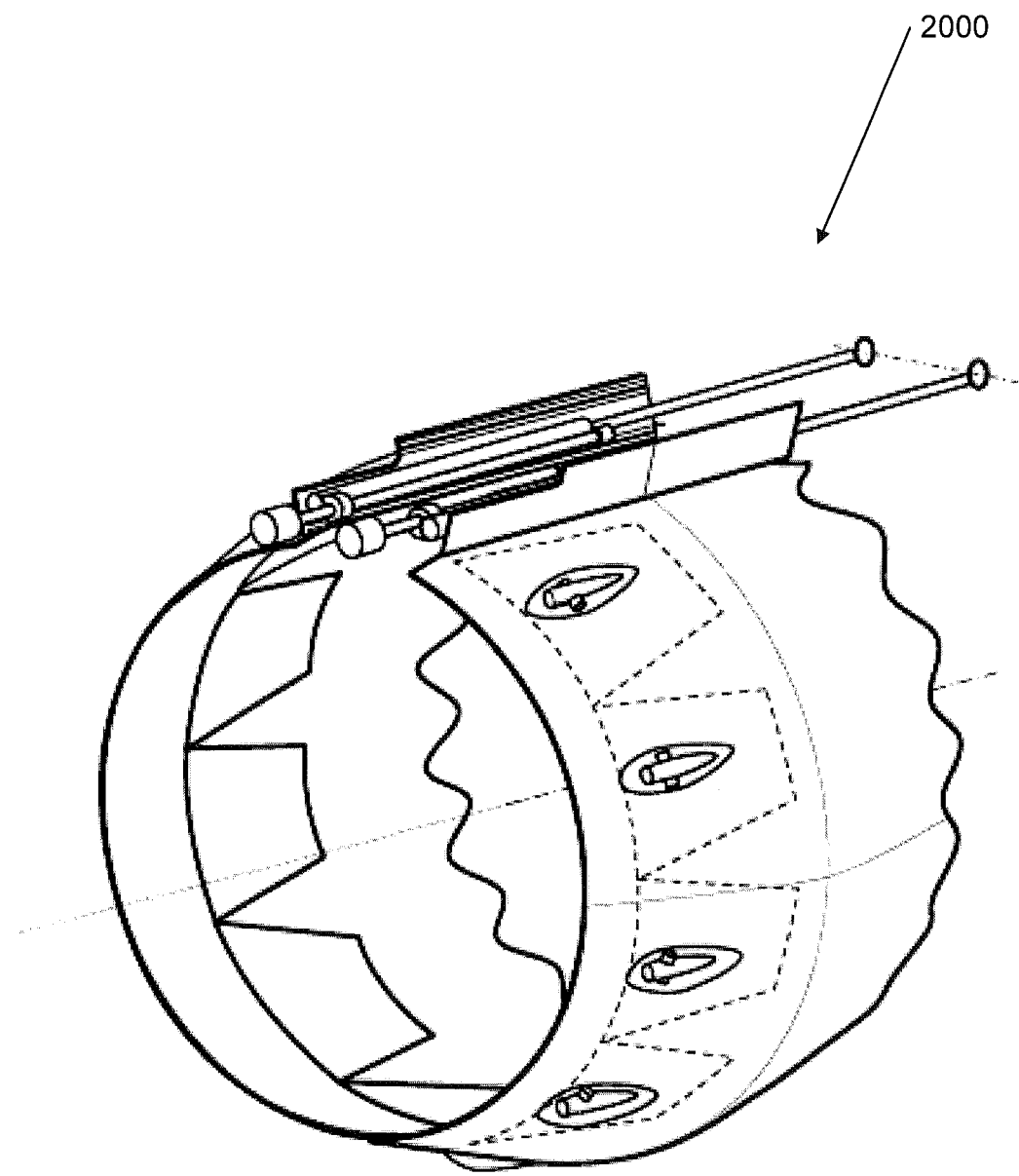
FIG. 18 is a perspective view of an integrated VAFN and thrust reverser according to an embodiment with the blocked door actuators in the VAFN airfoil, showing a one-piece thrust reverser assembly.

FIG. 18 is a perspective view of an integrated VAFN and thrust reverser assembly 2000 according to an embodiment with blocker door actuators that are mounted in the VAFN airfoil, showing a one-piece integrated VAFN airfoil and blocker door. The assembly 2000 is mounted on a nacelle on a pylon and is suitable for use with "O" Duct and with integrated propulsion systems. The blocker doors in FIG. 18 are operated without use of drag links but by actuators (not shown in FIG. 18).

Figure 19:
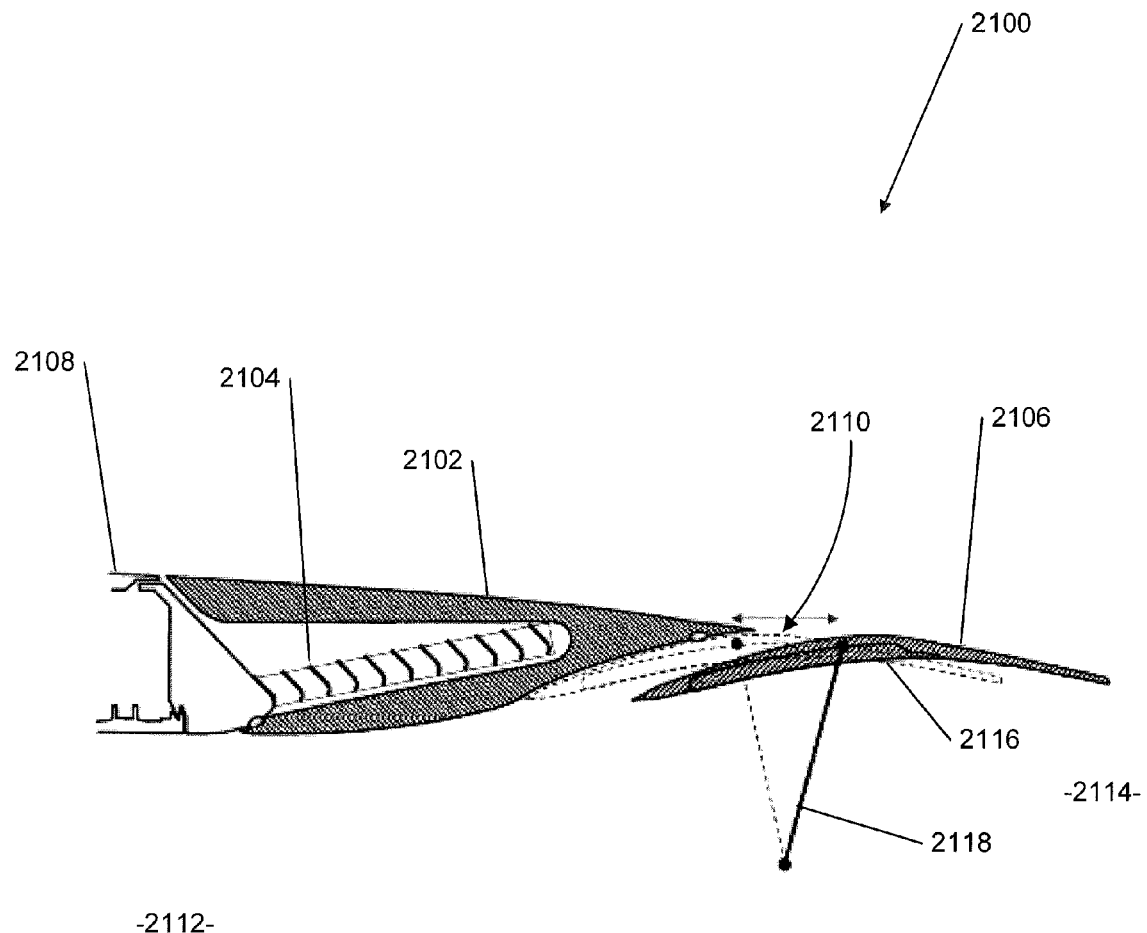
FIG. 19 is a partially schematic section view of an integrated VAFN and thrust reverser according to an alternative embodiment in the VAFN flow position, showing a fixed cascade array and internal fixed structure.

FIG. 19 is a partially schematic section view of an integrated VAFN and thrust reverser assembly 2100 according to an alternative embodiment, in the VAFN flow position. In the FIG. 19 embodiment, the cascade array is fixed in place and does not move for the thrust reverse operation. FIG. 19 shows the assembly 2100 with a translatable sleeve 2102 containing a fixed cascade array 2104, as well as a VAFN airfoil 2106 that can be moved aft with the translatable sleeve. In the VAFN flow position of FIG. 19, the VAFN airfoil 2106 is moved aft away from the engine nacelle 2108 to a position away from the translatable sleeve 2102 to create an opening 2110 between the translatable sleeve and the VAFN airfoil, such that the airflow in the bypass duct 2112 is split into a flow through the bypass duct exit 2114 and a flow that may exit the bypass duct through the opening 2110. Blocker doors 2116 that are integrated into the airfoil 2106 are shown flush against an inside surface of the airfoil 2106, to provide a smooth aerodynamic surface in the bypass duct. The blocker doors are held flush in position by drag links 2118. In the VAFN flow position of FIG. 19, the airfoil is translated aft to create the passage 2110 for VAFN effects. The elongated VAFN exit path avoids flow separation in the bypass duct and maintains a desired cross section area increase for the airflow as it exits the opening 2110. Dashed lines indicate the position of the airfoil in the stowed position. The arrowheads indicate the movement of the airfoil between the stowed position and the VAFN flow position.

Figure 20:
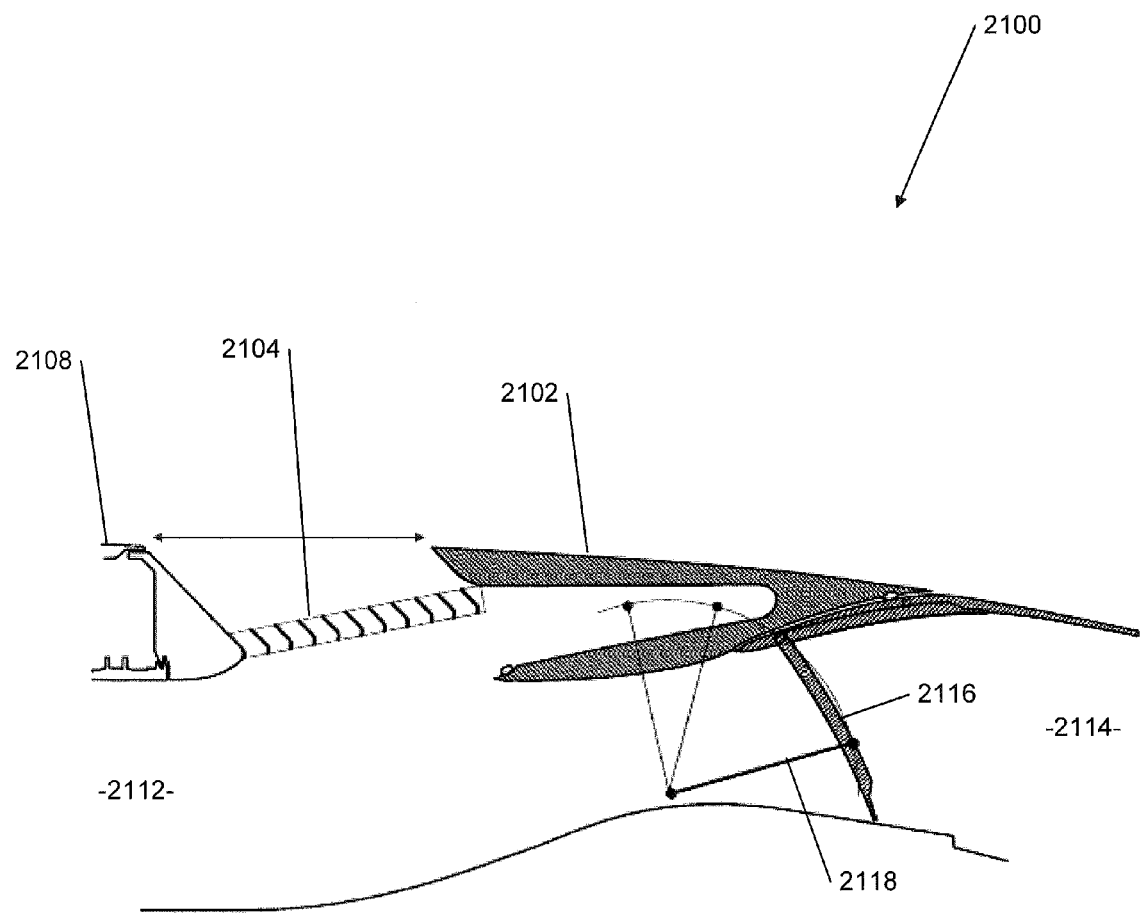
FIG. 20 is a partially schematic section view of the integrated VAFN and thrust reverser of FIG. 19 in the thrust reverse position.

FIG. 20 is a partially schematic section view of the integrated VAFN and thrust reverser assembly 2100 of FIG. 19 in the thrust reverse position. In FIG. 20, the blocker doors 2116 are deployed into the bypass duct 2112 by the drag links 2118. The cascade array 2104 is fixed and has not moved from its position in FIG. 19. In FIG. 20, the translatable sleeve 2102 has been moved and has uncovered the cascade array 2104, so that the blocker doors 2116 cause a portion of the air flow to exit the bypass duct through the cascade array 2104.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A nacelle assembly for a turbofan engine having an engine centerline, the nacelle assembly comprising:
    a forward nacelle portion having an aft edge and defining a bypass duct that extends at least partially around the engine centerline, the bypass duct being configured to transport bypass airflow of the engine;
    a translatable sleeve having a forward edge that extends circumferentially at least partially around the bypass duct and that is translatable away from the aft edge of the forward nacelle portion; and
    a variable area fan nozzle (VAFN) airfoil having a forward end and an aft end, wherein the VAFN airfoil is movable between (a) a stowed position, (b) a VAFN flow position, and (c) a thrust reverse position, and includes one or more blocker doors coupled to the VAFN airfoil;
    wherein, in the stowed position, the VAFN airfoil is substantially adjacent the translatable sleeve and forms a substantially continuous outer surface extending from an outer surface of the forward nacelle portion, to the translatable sleeve, and to the aft end of the VAFN airfoil;

wherein, in the VAFN flow position, the VAFN airfoil is moved aft away from the translatable sleeve to create an opening between the translatable sleeve and the VAFN airfoil, such that an airflow in the bypass duct is split into a flow through the bypass duct and a flow that may exit the bypass duct through the opening, and the one or more blocker doors are disposed radially against the VAFN airfoil; and wherein, in the thrust reverse position, the VAFN airfoil and the translatable sleeve are moved aft away from the aft edge of the forward nacelle portion to expose a cascade array comprising an opening, and the one or more blocker doors are deployed so as to move from a position adjacent an inner surface of the VAFN airfoil to a position that extends into the bypass duct, such that at least a portion of the airflow in the bypass duct is directed out the bypass duct through the cascade array.

2. The nacelle assembly of claim 1, wherein the cascade array is configured to move independently of the VAFN airfoil.

3. The nacelle assembly of claim 2, wherein the cascade array is configured to move simultaneously with the translatable sleeve.

4. The nacelle assembly of claim 3, wherein the cascade array is coupled to the translatable sleeve.

5. The nacelle assembly of claim 1, wherein the VAFN airfoil further includes a mechanism that moves the blocker doors from a position adjacent an inner surface of the VAFN airfoil to a position that extends into the bypass duct.

6. The nacelle assembly of claim 5, wherein the VAFN airfoil mechanism comprises a drag link.

7. The nacelle assembly of claim 6, wherein the drag link is a link having an end attached to the blocker doors and configured such that the blocker doors are moved to the position that extends into the bypass duct when the VAFN airfoil is moved.

8. The nacelle assembly of claim 5, wherein the mechanism comprises an actuator.

9. The nacelle assembly of claim 1, wherein the translatable sleeve further includes a mechanism that moves the blocker doors from a position adjacent an inner surface of the VAFN airfoil to a position that extends into the bypass duct.

10. The nacelle assembly of claim 9, wherein the mechanism comprises an actuator.

11. The nacelle assembly of claim 10, wherein the actuator is coupled to the VAFN airfoil and moves the VAFN airfoil between the stowed, VAFN flow, and thrust reverse positions.

12. The nacelle assembly of claim 1, wherein the nacelle assembly is mounted on a pylon of an aircraft.

13. The nacelle assembly of claim 12, wherein the translatable sleeve is mounted to the pylon.

14. The nacelle assembly of claim 1, further including a mechanism in the forward nacelle portion that moves the blocker doors to move from a position adjacent an inner surface of the VAFN airfoil to a position that extends into the bypass duct.

15. The nacelle assembly of claim 14, wherein the mechanism comprises an actuator.

16. The nacelle assembly of claim 1, wherein the one or more blocker doors move with the VAFN airfoil as the VAFN airfoil moves from the stowed position to the VAFN flow position.

17. A nacelle assembly for a turbofan engine having an engine centerline, the nacelle assembly comprising:

a forward nacelle portion having an aft edge and defining a bypass duct that extends at least partially around the engine centerline, the bypass duct being configured to transport bypass airflow of the turbofan engine;

a translatable sleeve having a forward edge that extends circumferentially at least partially around the bypass duct and that is translatable away from the aft edge of the forward nacelle portion; and a variable area fan nozzle (VAFN) airfoil that includes a forward end and an aft end, each of which extends circumferentially at least partially around the bypass duct, and that is movable between a stowed position, a VAFN flow position, and a thrust reverse position;

wherein:
when the VAFN airfoil is in the stowed position, the VAFN airfoil is located in a position substantially adjacent the aft edge of the translatable sleeve and forms a substantially continuous outer surface extending from an outer surface of the forward nacelle portion, to the translatable sleeve, and to the aft end of the VAFN airfoil, when the VAFN airfoil is in the VAFN flow position, the VAFN airfoil is located in an aft position, away from the translatable sleeve, to create an opening between the translatable sleeve and the VAFN airfoil, such that an airflow in the bypass duct is split into a flow through the bypass duct and a flow that may exit the bypass duct through the opening, and when the VAFN airfoil is in the thrust reverse position, the VAFN airfoil and the translatable sleeve are located in an aft position away from the aft edge of the forward nacelle portion and a cascade array is exposed, the cascade array comprising an opening in the bypass duct, and one or more blocker doors directly attached to the VAFN airfoil are deployed so as to move from a position adjacent an inner surface of the VAFN airfoil to a position that extends into the bypass duct, such that the airflow in the bypass duct is directed out the bypass duct through the cascade array; and wherein the one or more blocker doors are configured to move with the VAFN airfoil such that the one or more blocker doors remain in the position adjacent the inner surface of the VAFN airfoil when the VAFN airfoil is in the stowed position and the VAFN airfoil is in the VAFN flow position.

18. A nacelle assembly for a turbofan engine having an engine centerline, the nacelle assembly comprising:

a forward nacelle portion having an aft edge and defining a bypass duct that extends at least partially around the engine centerline, the bypass duct being configured to transport bypass airflow of the engine;

a translatable sleeve having a forward edge that extends circumferentially at least partially around the bypass duct and that is translatable away from the aft edge of the forward nacelle portion; and a variable area fan nozzle (VAFN) airfoil having a forward end and an aft end, wherein the VAFN airfoil is movable between (a) a stowed position, (b) a VAFN flow position, and (c) a thrust reverse position, and the VAFN airfoil includes one or more blocker doors coupled to the VAFN airfoil;

wherein, in the stowed position, the VAFN airfoil is substantially adjacent the translatable sleeve, and the translatable sleeve airfoil is substantially adjacent the forward nacelle portion;

wherein, in the VAFN flow position, the VAFN airfoil is moved aft away from the translatable sleeve to create an opening between the translatable sleeve and the VAFN airfoil, such that an airflow in the bypass duct is split into a flow through the bypass duct and a flow that may exit the bypass duct through the opening, and wherein the one or more blocker doors move with the VAFN airfoil as the VAFN airfoil moves from the stowed position to the VAFN flow position; and wherein, in the thrust reverse position, the VAFN airfoil and the translatable sleeve are moved aft away from the aft edge of the forward nacelle portion to expose a cascade array comprising an opening, and the one or more blocker doors are deployed so as to move from a position adjacent an inner surface of the VAFN airfoil to a position that extends into the bypass duct, such that at least a portion of the airflow in the bypass duct is directed out the bypass duct through the cascade array.

* * * * *